US012631863B2

(12) United States Patent
Fischer et al.

(10) Patent No.: US 12,631,863 B2
(45) Date of Patent: May 19, 2026

(54) LUMINESCENCE MICROSCOPE FOR IMAGING A SAMPLE OR FOR LOCALIZING OR TRACKING EMITTERS IN A SAMPLE

(71) Applicant: ABBERIOR INSTRUMENTS GMBH, Goettingen (DE)

(72) Inventors: Joachim Fischer, Karlsruhe (DE); Noel Moliere, Stadthagen (DE)

(73) Assignee: ABBERIOR INSTRUMENTS GMBH, Goettingen (DE)

( * ) Notice: Subject to any disclaimer, the term of this patent is extended or adjusted under 35 U.S.C. 154(b) by 315 days.

(21) Appl. No.: 18/377,970

(22) Filed: Oct. 9, 2023

(65) Prior Publication Data

US 2024/0134176 A1    Apr. 25, 2024
US 2024/0231066 A9    Jul. 11, 2024

(30) Foreign Application Priority Data

Oct. 19, 2022    (DE) ..................... 10 2022 127 620.1

(51) Int. Cl.
G02B 21/00    (2006.01)

(52) U.S. Cl.
CPC ..... G02B 21/0032 (2013.01); G02B 21/0076 (2013.01)

(58) Field of Classification Search
CPC ............ G02B 21/0032; G02B 21/0076; G02B 21/008; G01N 2201/0675; G01N 21/6458
See application file for complete search history.

(56) References Cited

U.S. PATENT DOCUMENTS 9,632,297 B1 *    4/2017  Reuss ..................... G02F 1/292
9,778,177 B2 *    10/2017  Roke .................. G01N 15/1434
(Continued)

FOREIGN PATENT DOCUMENTS

CN          111879234 B      11/2021
DE      102014113716 B4      11/2021
(Continued)

OTHER PUBLICATIONS

Bingen et al., "Parallelized STED fluorescence nanoscopy," Optics Express, 2011, pp. 23716- 23726, vol. 19, No. 24.
(Continued)

*Primary Examiner* — Mustak Choudhury
(74) *Attorney, Agent, or Firm* — MOSER TABOADA

(57)          ABSTRACT
The specification relates to a luminescence microscope comprising a first light source for generating an input light beam, a light modulator comprising a first active surface and a second active surface, for modulating the phase and/or amplitude of the light incident on the respective active surface, an objective lens for focusing the light into a sample so that an light intensity distribution is formed in the sample, wherein the luminescence microscope comprises a first beam displacement element for polarization-dependent generation of a first output light beam and/or a second output light beam forming an angle of less than 90°, wherein the first beam displacement element is arranged such that that the first output light beam impinges on the first active surface and the second output light beam impinges on the second active surface and a method for imaging a sample or for localizing or tracking emitters in the sample.

23 Claims, 11 Drawing Sheets

(56) References Cited

U.S. PATENT DOCUMENTS

| | | | | |
|---|---|---|---|---|
| 2004/0227101 | A1* | 11/2004 | Iketaki | G02B 26/08 |
| | | | | 250/458.1 |
| 2007/0160175 | A1* | 7/2007 | Lang | G02B 21/0032 |
| | | | | 376/103 |
| 2015/0208144 | A1* | 7/2015 | Holmes | H04Q 11/0003 |
| | | | | 398/48 |
| 2017/0123197 | A1* | 5/2017 | Reuss | G02B 21/0032 |
| 2021/0181489 | A1* | 6/2021 | Uhl | G02B 21/365 |
| 2021/0247600 | A1* | 8/2021 | Siebenmorgen | G02B 21/367 |

FOREIGN PATENT DOCUMENTS

| | | | |
|---|---|---|---|
| WO | WO 2014/027204 A1 | 2/2014 | |
| WO | WO 2020/064108 A1 | 4/2020 | |

OTHER PUBLICATIONS

Egidijus Auksorius, "Multidimensional Fluorescence Imaging and Super-resolution Exploiting Ultrafast Laser and Supercontinuum Technology", Department of Physics Imperial College London, Dec. 2008, pp. 1-200, https://doi.org/10.25560/42013.

Mo et al., "3-D stimulated emission depletion microscopy with programmable aberration correction", Journal of Biophotonics. 2014, pp. 29-36, No. 1-2, www.biophotonics-journal.org, doi: 10.1002/jbio.201300041.

Martin O. Lenz et al., "3-D stimulated emission depletion microscopy with programmable aberration correction", Journal of Biophotonics 7, 2014, pp. 29-36, No. 1-2, www.biophotonics-journal.org, doi: 10.1002/jbio.201300041.

* cited by examiner

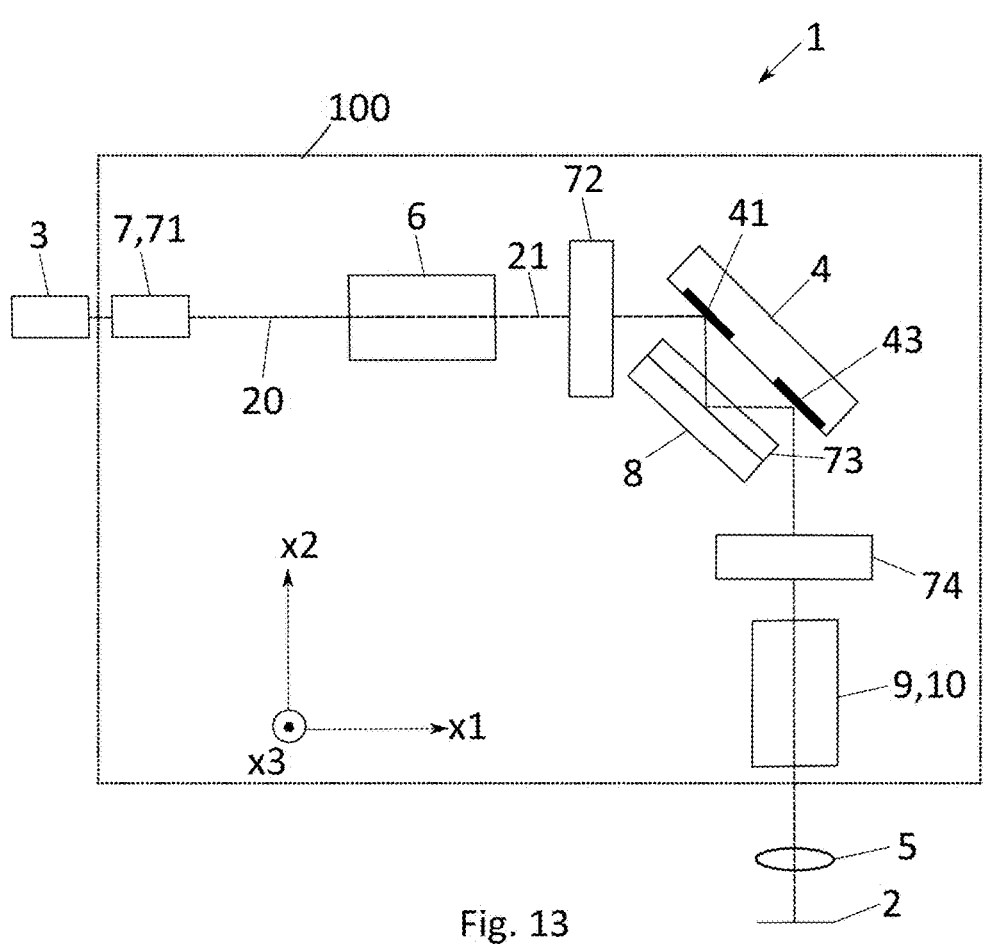
Fig. 13
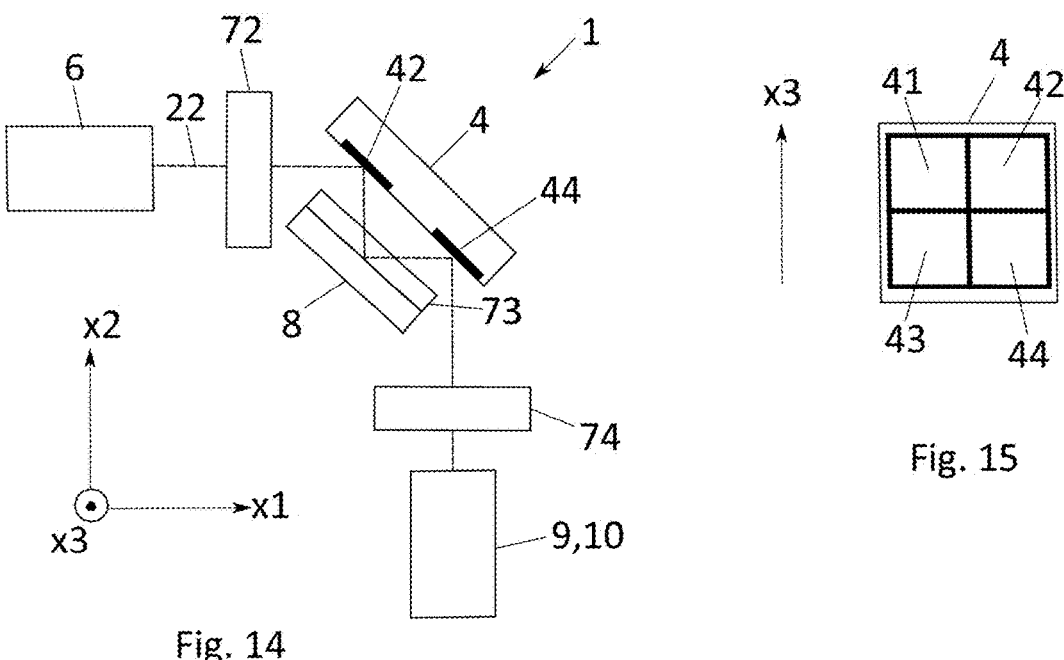
Fig. 14
Fig. 15

LUMINESCENCE MICROSCOPE FOR IMAGING A SAMPLE OR FOR LOCALIZING OR TRACKING EMITTERS IN A SAMPLE

CROSS-REFERENCE TO RELATED APPLICATIONS

The present application claims the benefit of and priority to DE Patent Application Serial No. 10 2022 127 620.1, filed Oct. 19, 2022, the entire contents of which is incorporated herein by reference.

TECHNICAL FIELD OF THE INVENTION

The present specification relates to a luminescence microscope for imaging a sample or for localizing or tracking emitters in a sample, and to a method for microscopically imaging a sample or for localizing or tracking emitters in a sample.

PRIOR ART

Methods are known from the field of light microscopy in which a structured light intensity distribution is formed at the focus in the sample by phase or amplitude modulation of a light beam.

For example, U.S. Pat. No. 9,778,177 B2 describes an SHG (second harmonic generation) microscope with an optical unit that generates multiple time-shifted and phase-modulated output light beams from an input light beam in a polarization-dependent manner. The unit comprises a so-called beam displacer, which splits the input light beam into parallel output beams in a polarization-dependent manner, the output beams being reflected at two fields of a light modulator to imprint a phase pattern on the beams. The light modulator is arranged in an image plane conjugate to the focal plane in the sample. In the sample, the coherent output light beams form a light intensity distribution by interference. In this way, specific temporal excitation patterns can be realized, generating specific SHG signals. Due to the use of the SHG technique, the application of this microscope is limited to very special samples.

One example from the field of luminescence microscopy for the generation of light intensity distributions with a local minimum, ideally an intensity zero, by phase modulation, for which a wide variety of dyes are available to label samples, is STED microscopy.

In STED microscopy, for example, so-called donut or bottle beam distributions are formed from STED (stimulated emission depletion) light in order to de-excite the emitters in a region around the central intensity minimum from the excited state to the ground state by stimulated emission, so that they do not emit luminescence light. This narrows the excitation point spread function and resolutions well below the diffraction limit can be achieved.

For example, in the publication "Pit Bingen, Matthias Reuss, Johann Engelhardt, and Stefan W. Hell, "Parallelized STED fluorescence nanoscopy," Opt. Express 19, 23716-23726 (2011)," a STED microscope is described in which a STED light beam is split into multiple parallel beams in a polarization-dependent manner using an array of Wollaston prisms. These travel parallel to each other across a galvo scanner and a segmented phase plate and are then focused into the sample by the objective lens, forming a pattern of multiple STED donuts.

Light intensity distributions with a central intensity minimum are also formed in so-called MINFLUX microscopy, in particular from excitation light, in order to determine the position of a single emitter with very high precision in the single-digit nanometer range and with very effective use of the emitted photons. In this case, the light distribution is placed relative to the sample successively at illumination points of an illumination pattern and for each illumination position the photons emitted by the emitter are recorded. The position of the emitter can then be determined from this data, taking advantage in particular of the fact that the closer the intensity zero point of the light intensity distribution is to the actual position of the emitter, the lower the photon emission rate.

For both use cases (STED and MINFLUX microscopy), the light intensity distributions with the local minimum are often generated by phase modulating the STED or excitation light with a phase filter or a controllable spatial light modulator (SLM).

In both STED microscopy and MINFLUX microscopy, it is useful for certain applications to have access to different types of light intensity distributions. For example, a so-called (2D) donut distribution provides optimal lateral resolution in STED microscopy but does not improve axial resolution. The so-called bottle-beam distribution (sometimes also referred to as 3D donut) has intensity maxima in the axial direction and therefore improves axial resolution. However, the intensity increases more slowly in the lateral direction than in the donut distribution for the same total intensity, so that a STED image acquired with a bottle beam has significantly lower lateral resolution than a STED image acquired with a donut. This problem is described, for example, in the dissertation by Egidijus Auksorius, "Multi-dimensional Fluorescence Imaging and Super-resolution Exploiting Ultrafast Laser and Supercontinuum Technology," https://doi.org/10.25560/42013, 2008.

The publication "Lenz M O, Sinclair H G, Savell A, Clegg J H, Brown A C, Davis D M, Dunsby C, Neil M A, French P M. 3-D stimulated emission depletion microscopy with programmable aberration correction. J Biophotonics. 2014 January; 7(1-2):29-36. doi: 10.1002/jbio.201300041. Epub 2013 Jun. 21. PMID: 23788459" describes a STED microscope that incoherently combines a donut distribution and a bottle-beam distribution in the sample to optimize both lateral resolution and axial resolution. For this purpose, a STED beam is split into two incoherent components with mutually orthogonal linear polarization directions and directed sequentially onto two fields of a spatial light modulator. Holograms are displayed on each of the fields, resulting in a donut distribution and a bottle-beam distribution at the focus by phase modulation. When incident on the first field of the light modulator, the first component is phase modulated first, while the other component remains unchanged because the light modulator phase modulates the light diffracted at its active surface in a polarization-dependent manner. Then, the STED beam is imaged onto the other field of the light modulator by means of a lens and a mirror, and the light beam passes through an λ/4 plate twice so that the polarization of both components is rotated by 90°. Thus, when the beam hits the other field, the second component is phase modulated, but the first component remains unchanged. Since the two components are delayed from each other by more than their coherence length, an incoherent superposition of the two resulting light intensity distributions results at the focus.

In the patent specification DE 10 2014 113 716 B4 a module for a STED microscope is described, which realizes the combination of two light intensity distributions in an extremely space-saving and, with regard to the adjustment effort, simpler and more robust way. Likewise, a STED light beam with two orthogonally polarized components is successively directed onto two fields of a light modulator, wherein the polarization direction is rotated by 90° during the back reflection onto the second field so that each field of the light modulator modulates only one component of the light beam. However, the imaging optics are not used. Instead, the collimated light beam is reflected from the first field to the second field. For this purpose, a flat optical element consisting of a mirror and λ/4 plate is placed close to the light modulator, which greatly reduces the required installation space. In addition, by eliminating the lens, the system is much easier to adjust.

According to an embodiment of DE 10 2014 113 716 B4, a chromatic λ/4 plate is used to rotate the polarization of the STED beam. This has the advantage that the excitation light beam can be guided together with the STED beam over both fields of the light modulator without modulating the phase of the excitation beam if the spectral properties are selected accordingly.

A lateral offset of the modulated light beams occurring due to the slightly different diffraction or reflection angles of the orthogonally polarized components at the active surface of the light modulator can be corrected in the above-described system according to DE 10 2014 113 716 B4 by correcting the phase pattern.

For some applications of STED microscopy and MIN-FLUX microscopy, it would be desirable not only to be able to combine different light intensity distributions at the focus, but also to be able to switch quickly between different light intensity distributions. Switching is possible with light modulators with switchable pixels, but it is too slow for many applications.

Patent application US 2021/0247600 A1 describes a light microscope with an acousto-optically tunable filter (AOTF) or an electro-optical modulator (EOM), which can be used to generate light intensity distributions variably adjustable over the beam cross-section from light of different wavelengths and polarizations at the focus. For this purpose, the light is coupled into a partial beam path with a polarization beam splitter. In the partial beam path, the light beam passes successively over two fields of the same light modulator, but in different directions depending on its polarization direction. An λ/2 plate is arranged so that the light beam passes through it twice, before hitting a first field of the light modulator and after hitting the first field. Thus, depending on its direction of travel (which in turn depends on its polarization), the light beam is phase modulated either by the first field only or by the second field only. After phase modulation, the light beam returns to the polarization beam splitter regardless of its direction of travel and is coupled by it into a main beam path.

With such a system, it is in principle possible to switch quickly between different light intensity distributions, such as a donut and a bottle beam or a donut and a regular Gaussian focus.

However, the setup described in US 2021/0247600 A1 requires a relatively large installation space, since the light beam must be deflected several times through larger angles in order to be able to use the partial beam path with the light modulator in both directions in a polarization-dependent manner.

OBJECTIVE OF THE PRESENT SPECIFICATION

Therefore, it is the object of the present specification to provide a luminescence microscope and method that can be used to generate different light intensity distributions at the focus in a sample simultaneously or in rapid succession in a space-saving manner.

Solution

This objective is attained by the subject matter of the independent claims. Advantageous embodiments are given in the subclaims and are described below.

Description

A first aspect of the present specification relates to a luminescence microscope for imaging a sample or for localizing or tracking emitters in a sample, comprising a first light source, at least one light modulator comprising a first active surface and a second active surface, the first active surface and the second active surface being configured to modulate the phase and/or the amplitude of light incident on the respective active surface, and an objective lens which is configured to focus the light modulated in its phase and/or its amplitude by the light modulator into a sample, so that at least one light intensity distribution, in particular a light intensity distribution with a local minimum, further in particular an intensity zero, is formed in the sample.

According to the first aspect, the luminescence microscope comprises a first beam displacement element configured to generate a first output light beam and/or a second output light beam from an input light beam generated by the first light source in a polarization-dependent manner, wherein the first beam displacement element is arranged such that the first output light beam impinges on the first active surface and the second output light beam impinges on the second active surface, wherein the first beam displacement element is configured such that the first output light beam and the second output light beam form an angle of less than 90° with respect to each other when exiting the first beam displacement element. In particular, the first output light beam impinges on the first active surface such that the first output light beam is modulated by the first active surface in its phase and/or in its amplitude and/or the second output light beam impinges on the second active surface such that the second output light beam is modulated by the second active surface in its phase and/or in its amplitude.

With the first beam displacement element, the light beam is directed either onto the first active surface or onto the second active surface, depending on its polarization direction, and not onto the first active surface and the second active surface in succession as in the prior art. Due to the fact that the output light beams emanating from the first beam displacement element form an acute angle to each other, the light intensity distributions can be implemented in a particularly space-saving manner. As an additional advantage, when using a light-diffracting light modulator (e.g., a so-called spatial light modulator, SLM, with a blaze grating), both output light beams are diffracted at the same angle, whereby no lateral offset occurs between the generated light intensity distributions.

In the context of the present specification, the term "luminescence microscope" means a light microscope that generates an image from a luminescence signal from emitters in a sample or localizes or tracks the emitters based on the luminescence signal. Luminescence is a phenomenon in which an emitter is transformed from the ground state to an excited state by excitation light, from which the emitter falls back to the ground state by emitting a luminescence photon, the luminescence photon having a lower energy than the photon of the excitation light (for the case of single photon excitation) or the energy of the luminescence photon being lower than the sum of the photons of the excitation light (for the case of multiple photon excitation). The term luminescence includes in particular fluorescence, phosphorescence, two-photon excitation and the so-called 'photon upconversion', but not, for example, second harmonic generation (SHG). In particular, the luminescence signal has a lifetime (the time interval between excitation and emission) of 0.1 ns or more. In contrast, processes such as light scattering and SHG occur on a much smaller time scale (quasi-instantaneous for many applications).

The use of luminescence has the advantage that a wide variety of luminescence markers are available for sample structures, allowing flexible application of the luminescence microscope of the first aspect.

The first light source may comprise one or more lasers and optionally further optical elements such as polarizers, optical fibers or the like. For example, the first light source may comprise, in particular, a first laser and a second laser whose light is combined, e.g., with a beam splitter. Therein, the light from the first laser and the second laser may be linearly polarized orthogonally to each other. Alternatively, the light from a single laser may be split, e.g., with a beam splitter, and the partial beams may be linearly polarized in mutually orthogonal directions. If the first light source comprises two or more lasers, they may generate light of the same wavelength or of different wavelengths.

The first light source or the luminescence microscope may further comprise a switching element that allows switching between the orthogonally polarized beams. For example, one of the light beams may be shadowed by an acousto-optic modulator in response to a switching signal for this purpose. Certain lasers, e.g., diode lasers, can of course also be modulated directly and thus switched on or off by the switching element. Switching the polarization direction may also be realized, in particular, by rotating the polarization of linearly polarized light from a laser by 90° using a switchable polarization rotator, such as a Pockels cell.

To incoherently combine two orthogonally linearly polarized components, for example, the light from two lasers may be correspondingly linearly polarized and combined at a beam splitter. Alternatively, it is also possible, for example, to split the light of a laser at a beam splitter and to couple one of the partial beams into an optical fiber, which delays the partial beam relative to the other partial beam by more than the coherence length.

Certain combinations of light distributions at the focus may also be realized without incoherent light sources or without delaying a component by more than the coherence length. For example, an input light beam of linearly polarized light from a laser, e.g., a STED laser, can be rotated by a retardation plate (especially an $\lambda/2$ plate) such that the polarization direction of the linearly polarized light beam is at an angle of 45° to a preferred direction of the first beam displacement element. The light then has a first component that is parallel to the preferred direction and a second component that is perpendicular to the preferred direction. The first beam displacement element thus splits the input light beam into the first output light beam and the second output light beam. For example, if the first output light beam is modulated with a vortex phase pattern and the second output light beam is modulated with a phase pattern with annular phase jump of $\pi$ to produce a superposition of a 2D donut and a 3D donut (bottle beams) at the focus, as known from STED microscopy, an $\lambda/4$ plate can be provided in the beam path in front of the objective lens, which left-handed circularly polarizes one of the output light beams and right-handed circularly polarizes the other output light beam. In this case, the lateral components of the first output light beam and the second output light beam do not interfere at the focus even if they originate from the same laser and are not delayed from each other by more than the coherence length. Interference then occurs only for the axial component, which for certain light distributions (e.g., the combination of 2D donut and 3D donut in STED microscopy) has no significant influence on the resulting intensity distribution at the focus or a negligible influence for the desired application. This is especially the case if at least one of the light distributions comprises a central zero extending along the optical axis (e.g., a 2D donut).

In the context of the present specification, the term "light modulator" refers to an optical component that modulates the phase or amplitude distribution of a light beam incident on an active surface of the light modulator.

Therein, a fixed phase or amplitude pattern may be imposed on the light beam. Corresponding phase modulators are also known as "phase filters" or "phase plates".

Alternatively, the light modulator may also display a variable phase or amplitude pattern on an active surface, in particular by electrical or optical control. For example, so-called spatial light modulators (SLM) with liquid crystals are known which have controllable pixels on which a variable phase distribution can be displayed. Furthermore, controllable amplitude modulators with arrays of individually tiltable micromirrors are known under the name digital mirror device (DMD).

Regardless of whether a fixed phase or amplitude pattern is specified or whether it can be changed by actuation, the active surface of the light modulator may modulate the light beam upon transmission of the active surface (such as in phase filters/phase plates), reflection from the active surface (e.g., in certain SLMs and in DMDs), or diffraction (e.g., in SLMs with blazed gratings).

A light modulator according to the present specification may comprise both the first active surface and the second active surface. These may be partial surfaces of a contiguous active surface of the light modulator or surfaces separate from each other. The same applies to the third and fourth active surfaces described further below, as well as other active surfaces, if any. Embodiments in which the first active surface and the second active surface are formed by the same light modulator have, in addition to the lower complexity and the lower costs, the advantage that the active surfaces cannot be de-aligned with respect to each other, i.e. are "adjustment-free", since they have a common beam path as long as the contiguous active surface of the light modulator can be regarded as planar. This advantageously reduces the adjustment effort of the luminescence microscope according to the first aspect.

Alternatively, the first and second active surfaces (as well as other active surfaces, if applicable) may belong to different light modulators.

The light modulator may modulate the light beam in its phase and/or amplitude depending on its polarization or independently of its polarization.

The first beam displacement element generates a first output light beam and/or a second output light beam from the input light beam depending on the polarization. This means that if the input light beam has only one linearly polarized component that is parallel or orthogonal to the preferred direction of the first beam displacement element, only the first output light beam or the second output light beam is generated depending on the polarization direction.

However, if the input light beam has components of both polarization directions (parallel and orthogonal to the preferred direction), the input light beam is split into the first output light beam and the second output light beam.

In particular, the first beam displacement element is a passive beam displacement element. In other words, the position and angle of the first output light beam and the second output light beam cannot be changed by controlling the first beam displacement element. Thus, the first displacement element is not a scanner, an electro-optical or acousto-optical modulator, or the like.

The first beam displacing element may in particular be a double refractive crystal such as a so-called calcite displacer or a Wollaston prism, Nomarski prism or similar. These elements generate parallel output light beams (calcite displacer) or output light beams arranged at an acute angle to each other (Wollaston prism and related optical components).

According to an embodiment, the first active surface and the second active surface modulate light incident on the respective active surface in its phase and/or in its amplitude in a polarization-dependent manner. This means in particular that the light incident on the respective surface is modulated in its phase and/or in its amplitude only if it has a component that is linearly polarized in a preferred direction of the active surface but is not modulated if it is linearly polarized in a direction orthogonal to the preferred direction.

In this way, the output light beam can be modulated by switching the polarization of the input light beam. This makes it possible, for example, to switch quickly between a donut or bottle-beam light distribution and a regular Gaussian focus.

According to an embodiment, the first active surface and the second active surface are arranged in a pupil plane conjugate to a pupil of the objective lens, wherein the first active surface and the second active surface are configured to modulate the first output light beam and/or the second output light beam in its phase. The pupil plane is a Fourier plane with respect to a focal plane in the sample, wherein the geometric focus is located in the focal plane. This makes it easy to set a desired intensity distribution at the focus, for example, a vortex phase distribution (also called helical phase distribution or phase clock) in the pupil plane can be used to set a donut distribution at the focus. Slight distances of the active surfaces from the pupil plane can be compensated by adjusting the phase pattern.

According to a further embodiment, the first beam displacement element is configured such that the first output light beam and the second output light beam form an angle of less than 45° with respect to each other. This can be achieved, for example, by first beam displacement elements that are configured as Wollaston prisms or calcite displacers. The required installation space of the luminescence microscope is thus further reduced.

According to a further embodiment, the first beam displacement element is configured so that the first output light beam and the second output light beam are parallel to each other. This can be realized, for example, by a first beam displacement element configured as a calcite displacer. The corresponding luminescence microscope can thus be configured to be particularly space-saving.

According to a further embodiment, the first active surface and the second active surface are partial surfaces of an active surface of the same light modulator. This advantageously reduces the installation space and the complexity of the luminescence microscope, especially since in the case of a controllable light modulator, such as an SLM, only one component needs to be controlled. In addition, as explained above, the adjustment effort is significantly reduced.

According to a further embodiment, the first light source is configured to provide the input light beam in a linearly polarized manner, wherein the luminescence microscope comprises a switching element, in particular a first polarization rotator, which is configured to rotate a polarization direction of the input light beam upon receiving a switching signal, in particular by 90°. The switching element may be, for example, an acousto-optic modulator that shades certain linearly polarized components of the input light beam upon receiving the switching signal, or the switching element may be, for example, a fiber coupler that selectively couples linearly polarized components of the input light beam (e.g., laser beams of different lasers) into an optical fiber upon receiving the switching signal. The switching element may also be, for example, a controller of a modulatable diode laser. Alternatively, a first polarization rotator may be used as the switching element. For example, Pockels cells or liquid crystal retarders are suitable as first polarization rotators. A Pockels cell enables particularly fast switching.

According to a further embodiment, the luminescence microscope comprises a second polarization rotator arranged between the first beam displacement element and the first active surface and/or between the first beam displacement element and the second active surface, wherein the second polarization rotator is configured to rotate the polarization direction of the first output light beam and/or of the second output light beam, in particular by 90°, in particular upon receiving a switching signal. According to one embodiment, the second polarization rotator may be a passive polarization rotator.

In the context of the specification, the term "passive polarization rotator" describes a polarization rotator which rotates the polarization direction of a light beam incident on the polarization rotator by a fixed predetermined value (which may be changed by changing an orientation in the course of an adjustment) independently of a drive signal. This may be e.g., a λ/2 plate.

The passive polarization rotator is arranged in particular either between the first beam displacement element and the first active surface or between the first beam displacement element and the second active surface, the first active surface and the second active surface modulating the respective output light beam in a polarization-dependent manner. Furthermore, the passive polarization rotator is aligned in particular with respect to the first beam displacement element and the first active surface or the second active surface such that the output beam whose polarization direction is perpendicular to the preferred direction of the respective first or second active surface of the light modulator is rotated by the second polarization rotator such that the light beam incident on the respective first or second active surface is polarized parallel to the preferred direction.

If, for example, only the first or the second output light beam is selectively generated by switching with the switching element (in particular the first polarization rotator), and the first active surface and the second active surface have the same preferred direction (which is advantageous because the first and the second active surface can then be formed by the same light modulator), the second polarization rotator may ensure that the first and the second output light beam are modulated by the respective active surface. This makes it possible, for example, to switch between two light intensity distributions with a local minimum (e.g., a donut and a bottle beam) at the focus by displaying a vortex distribution on the first active surface and an annular phase jump on the second active surface on a single SLM.

If the input light beam comprises two combined orthogonally linearly polarized components, the second polarization rotator may be used to achieve that both components are modulated by the respective first or second active surface, if the first active surface and the second active surface have the same preferred direction, e.g., belong to the same SLM. This allows, for example, the generation of a superposition of a donut with a bottle beam at the focus. For this embodiment, no switching element (in particular no first polarization rotator) is required to switch the polarization direction of the input light beam.

In particular, if the first active surface and the second active surface have preferred directions orthogonal to each other, which can be achieved, for example, by using two separate light modulators, the applications described above may be realized even without a second polarization rotator.

Alternatively to the embodiments shown above, the second polarization rotator may also be configured as an active (switchable) polarization rotator (e.g. as a Pockels cell or as a liquid crystal retarder), e.g. if a third active surface and a fourth active surface are additionally provided as described further below. In this way, it can be variably set, for example, whether the respective output light beam is to be modulated by the respective first or second active surface or not.

For certain other applications, it may also be advantageous to arrange an appropriately sized passive or active second polarization rotator between the first beam displacement element and the first and second active surfaces such that the second polarization rotator rotates the polarization direction of both the first output light beam and the second output light beam. For this purpose, it is particularly advantageous if the first beam displacement element generates parallel first and second output light beams, since the active surface or aperture of the second polarization rotator can then be narrower.

According to a further embodiment, the second polarization rotator is configured to rotate the polarization direction of the first or the second output light beam depending on its wavelength. I.e., the second polarization rotator is chromatic. In the case of a passive second polarization rotator, for example, a chromatic $\lambda/2$ plate may be used. This has the advantage that further light beams, whose wavelength differs from the phase and/or amplitude modulated light beams, can be guided via the first beam displacement element and the at least one light modulator without modulating them in their phase and/or amplitude. Such a light beam is then not rotated by the second polarization rotator and, in particular, is merely reflected, or transmitted, without modulating its phase and/or amplitude by the first or second active surface, respectively, which is located behind the second polarization rotator and whose preferred direction is orthogonal to the polarization direction of the light beam. An example application of this is a STED microscope in which a phase modulated STED light beam is combined with an unmodulated excitation light beam to produce a superposition of the regular excitation focus with a STED donut at the focus. In this case, the second polarization rotator could be chromatically configured such that it does not rotate the polarization direction of the excitation light, so that the excitation light beam is merely reflected or transmitted from the first or second active surface. Such an embodiment further reduces the necessary space requirements and complexity of the luminescence microscope.

According to a further embodiment, the luminescence microscope comprises a third active surface and a fourth active surface of at least one light modulator, wherein the third active surface and the fourth active surface are configured and arranged such that the first output light beam impinges on the third active surface after impinging on the first active surface and, particularly, is modulated by the third active surface in its phase and/or in its amplitude, and the second output light beam impinges on the fourth active surface after impinging on the second active surface and, particularly, is modulated by the fourth active surface in its phase and/or in its amplitude.

The third active surface and the fourth active surface allow rapid switching between up to four different light intensity distributions at the focus in the sample by switching the polarization direction of a linearly polarized input light beam, e.g., between a donut, a bottle beam, and a Gaussian beam, or between a bottle beam, a Gaussian beam, and two light distributions with an intensity minimum extended along one surface, the surfaces being perpendicular to each other.

If the input light beam comprises two linearly polarized components orthogonal to each other, another application is to superimpose different combinations of two light distributions each in the sample and to switch rapidly between these combinations.

The third and fourth active surfaces, like the first and second surfaces, may be formed by a single light modulator or different light modulators.

According to a further embodiment, the third active surface and the fourth active surface modulate the light incident on the respective surface in its phase and/or in its amplitude depending on its polarization. This means in particular that the light incident on the respective surface is modulated in its phase and/or in its amplitude only if it comprises a component that is linearly polarized in a preferred direction of the active surface but is not modulated if it is linearly polarized in a direction orthogonal to the preferred direction.

In this way, the modulation of the output light beams can be easily influenced by switching the input polarization.

According to a further embodiment, the luminescence microscope comprises a third polarization rotator arranged between the first active surface and the third active surface and/or between the second active surface and the fourth active surface, which is configured to rotate the polarization direction of the first output light beam and/or the polarization direction of the second output light beam, in particular by 90°.

The third polarization rotator can be used, for example, to influence whether the first output light beam is modulated by the first active surface or by the third active surface, or whether the second output light beam is modulated by the second active surface or by the fourth active surface.

In particular, the third polarization rotator is a passive polarization rotator, such as $\lambda/2$ plate.

In particular, the third polarization rotator is configured and arranged to rotate both the polarization direction of the first output light beam and the polarization direction of the second output light beam. That is, the third polarization rotator is located in particular in the beam path of the first output light beam and the second output light beam. This is particularly easy to do if the first beam displacement element generates parallel first and second output light beams.

If the input light beam is linearly polarized, for example, the switching element, in particular the first polarization rotator, may first be used to determine whether the first output light beam is formed that falls on the first active surface or whether the second output light beam is formed that falls on the second active surface. Optionally, the second polarization rotator, which in this embodiment is configured in particular as a switchable (active) polarization rotator (e.g., as a Pockels cell), may then be used to set the polarization direction of the first and second output light beams so that they are optionally parallel or orthogonal to the preferred direction of the first active surface or the second active surface, respectively. This requires that the light modulator used modulates the phase and/or amplitude of the first and second output light beams, respectively, in a polarization-dependent manner. In particular, since only either the first output light beam or the second output light beam is formed, the second polarization rotator may be arranged to be impinged upon by both the first and second output light beams. After impinging on the first active surface, the first output light beam is rotated by the third passive polarization rotator, in particular by 90°, and subsequently impinges on the third active surface. This means that, depending on the initial polarization direction and depending on whether the polarization direction has been rotated by the second polarization rotator, the first output light beam is modulated in its phase and/or amplitude either only by the first active surface or only by the third active surface, so that a corresponding light intensity distribution is formed at the focus in the sample. Accordingly, the second output light beam is modulated in its phase and/or amplitude only by the second active surface or only by the fourth active surface, depending on its initial polarization direction and depending on whether the second polarization rotator was actuated.

In particular, in the embodiment described above with the passive third polarization rotator, the first and third active faces and the second and fourth active faces each comprise the same preferred direction. If the first and third active surfaces and the second and fourth active surfaces each have orthogonal preferred directions, the third polarization rotator may be omitted.

If the input light beam comprises two orthogonally linearly polarized components from which combined light distributions are to be generated, in particular an embodiment of the luminescence microscope with four polarization-dependent phase- and/or amplitude-modulating active surfaces may be used, in which the second polarization rotator is an active, switchable, polarization rotator (e.g. a Pockels cell) which further in particular rotates both the polarization direction of the first output light beam and the polarization direction of the second output light beam, in which the first active surface and the third active surface as well as the second active surface and the fourth active surface comprise equal (parallel) preferred directions, wherein a passive third polarization rotator is provided between the first and third active surfaces and between the second and fourth active surfaces, wherein in particular a single third polarization rotator rotates both the polarization direction of the first output light beam and the polarization direction of the second output light beam. Alternatively, the first active surface and the third active surface and the second active surface and the fourth active surface may each comprise orthogonal preferred directions, with no third polarization rotator provided. In this embodiment, by switching the second polarization rotator, the light distributions formed by phase and/or amplitude modulation at the first and second active surfaces or the light distributions formed by phase and/or amplitude modulation at the third and fourth active surfaces may alternatively be combined at the focus.

According to a further embodiment, the luminescence microscope comprises a reflection element arranged between the first active surface and the third active surface and/or between the second active surface and the fourth active surface, the reflection element being configured to reflect the first output light beam emanating from the first active surface onto the third active surface and/or to reflect the second output light beam emanating from the second active surface onto the fourth active surface.

By using a reflection element, it is easily possible to form the first active surfaces and the third active surface and/or the second active surface and the fourth active surface by the same light modulator. For this purpose, the respective output light beam is reflected back onto the same light modulator by the reflection element after first hitting the light modulator. In this case, the first and the third active surfaces and the second and the fourth active surfaces are, in particular, each partial surfaces of an active surface of the light modulator. As explained above for the first and the second surface, this reduces not only the complexity, the costs and the installation space, but also the adjustment effort of the luminescence microscope, since the active surfaces cannot be de-adjusted against each other.

The same reflection element may be used to reflect the first and second output light beams, or separate reflection elements may be provided for the first and second output light beams.

The reflection element may be, for example, a mirror or a prism.

According to a further embodiment, the third polarization rotator is arranged between the reflection element and the first and third active surfaces and/or between the reflection element and the second and fourth active surfaces. Further in particular, the third polarization rotator is traversed twice by the respective first or second output light beam (before and after reflection at the reflection element). In the case of a passive third polarization rotator, this may in particular be a $\lambda/4$ plate which is passed through twice by the respective first or second output light beam and is thus rotated by a total of 90°.

For a particularly compact design, the third polarization rotator may also be connected directly to the reflection element, for example by applying a layer acting as an $\lambda/4$ plate to a reflective surface.

According to a further embodiment, the first active surface, the second active surface, the third active surface and the fourth active surface are formed by the same light modulator. For this purpose, in particular, a common active surface of the light modulator is divided into four partial areas and the first beam displacement element, the reflection element and optionally the polarization rotators are arranged with respect to the active surface in such a way that the first output light beam and the second output light beam impinge on the respective active surface as indicated above.

According to a further embodiment, the first active surface, the second active surface, the third active surface and the fourth active surface are arranged along a line. For this purpose, in particular, the reflection element is arranged in such a way that it displaces the respective first or second output light beam in the same spatial direction as the first beam displacement element. Along the line, the active surfaces are arranged in particular in the following order: first active surface, second active surface, third active surface, fourth active surface.

According to a further embodiment, the first active surface, the second active surface, the third active surface and the fourth active surface form a two-dimensional arrangement, wherein the first beam displacement element and the reflection element are arranged relative to each other so that the first output light beam and the second output light beam are displaced relative to each other in a first direction by the first beam displacement element and are deflected in a second direction by the reflection element, wherein the second direction is non-parallel, in particular orthogonal, to the first direction. The reflection element may be, for example, a mirror tilted with respect to the active surface of the light modulator or a roof prism.

According to a further embodiment, the first light source is configured to provide the input light beam as a combination of a first linearly polarized component and a second linearly polarized component, wherein the polarization direction of the first component is orthogonal to the polarization direction of the second component.

According to a further embodiment, the first light source or the luminescence microscope is configured to non-coherently superimpose the first component and the second component. To ensure the non-coherent superposition, the two components of the input light beam may have a running difference with respect to each other that exceeds the coherence length. This may be realized, for example, by combining two laser sources. Alternatively, the light from a laser may be split into two partial beams, with one of the partial beams being delayed relative to the other partial beam. The partial beams then form the first component and the second component, respectively.

According to a further embodiment, the light source is configured to generate a linearly polarized input light beam, wherein the polarization direction of the input light beam is at an acute angle, in particular an angle of 45°, to a preferred direction of the first beam displacement element, so that the first beam displacement element splits the input light beam into the first output light beam and the second output light beam.

In this case, the input light beam also comprises two components with mutually orthogonal polarization directions, but they are coherent in particular if the input light beam originates, for example, from a single laser source. The preferred direction of the first beam displacement element (also referred to as the optical axis), determines light of which polarization direction passes through the first beam displacement element without deflection (light polarized parallel to the preferred direction) and light of which polarization direction is deflected by the first beam displacement element (light polarized perpendicular to the preferred direction). By the polarization direction of the input light beam having an acute angle (greater than 0° and less than 90°) to the preferred direction, both the first output light beam and the second output light beam are generated. When the angle to the preferred direction of the first beam displacement element is 45°, the two components have the same magnitude, so the first and second output light beams have the same intensity.

In particular, the luminescence microscope comprises a fifth polarization rotator, further in particular a passive fifth polarization rotator (e.g. a λ/2 plate), the fifth polarization rotator being arranged between the light source and the first beam displacement element, wherein the fifth polarization rotator is configured and arranged such that the polarization direction of the input light beam after passing through the fifth polarization rotator is at the acute angle, in particular the angle of 45°, to the preferred direction of the first beam displacement element. In particular, the fifth polarization rotator is coupled to a mechanical adjustment device for rotating a fast axis of the fifth polarization rotator. This may be driven, for example, by an electrically controllable actuator. In this way, the angle of the polarization direction of the input light beam can be easily adjusted to achieve a desired orientation relative to the preferred direction of the first beam displacement element and thus a desired intensity ratio between the first output light beam and the second output light beam.

According to a further embodiment, the luminescence microscope is configured such that light of the first component modulated in its phase and/or its amplitude by the at least one light modulator and focused by the objective lens and light of the second component modulated in its phase and/or its amplitude by the at least one light modulator and focused by the objective lens form a combined light intensity distribution in the sample.

According to a further embodiment, the luminescence microscope comprises a sixth polarization rotator, in particular an λ/4 plate, wherein the sixth polarization rotator is configured to circularly polarize a combined output light beam formed from the first output light beam and the second output light beam. With circularly polarized light, light distributions with local intensity minimum at the focus, e.g., 2D donuts or 3D donuts (bottle beams) can be generated particularly advantageously. In particular, such a sixth polarization rotator has the effect that a combined light distribution at the focus can be generated from the first output light beam and the second output light beam without the lateral components of the first output light beam and the second output light beam interfering at the focus, even if they originate from the same light source and are not delayed with respect to each other by more than the coherence length. Interference of the axial components does not occur for certain light distributions, especially when the light intensity along the optical axis is zero, as in the case of a 2D donut, or can be neglected.

According to a further embodiment, the luminescence microscope comprises an output beam combination unit configured to combine the first output light beam and the second output light beam into a combined output light beam, in particular wherein the output beam combination unit is the first beam displacement element or a further second beam displacement element. In particular, the first beam displacement element may be used as an output beam combination unit when the first output light beam and the second output light beam are reflected back into their initial direction, e.g., with the above-mentioned reflection element. Otherwise, a second beam displacement element may be arranged in the beam path behind the light modulator in the opposite direction to the first beam displacement element to obtain the combined output light beam. In particular, the second beam displacement element combines the first output light beam and the second output light beam in a polarization-dependent manner. In particular, for example, a Wollaston prism or a calcite displacer may be used as the second beam displacement element.

According to a further embodiment, the luminescence microscope comprises a fourth polarization rotator arranged between the at least one light modulator and the output beam combination unit, wherein the fourth polarization rotator is configured to rotate a polarization direction of the first output light beam or the second output light beam, in particular upon receiving a switching signal, so that the first output light beam and the second output light beam are combined by the output beam combination unit to form the combined output light beam. A fourth polarization rotator is required, in particular, when the output beam combination unit operates in a polarization-dependent manner, such as is the case with a Wollaston prism or a calcite displacer, to ensure that the first output light beam and the second output light beam have mutually orthogonal polarization directions after phase and/or amplitude modulation so that they are combined by the output beam combination unit.

In particular, the fourth polarization rotator is an active (switchable) polarization rotator such as a Pockels cell, wherein the fourth polarization rotator is coupled to further active polarization rotators (in particular the first and/or the second polarization rotator, if present) such that it compensates for the rotation of the polarization direction by the further active polarization rotator or rotators such that the polarization directions of the first output light beam and the second output light beam are orthogonal to each other when entering the output beam combination unit, in particular the second beam displacement element.

According to a further embodiment, the luminescence microscope comprises a control unit configured to control the at least one light modulator such that a light intensity distribution with a local minimum is formed in the sample. For this purpose, the light modulator may in particular comprise an active surface with pixels comprising individually controllable retardation values. The control unit may control the light modulator, for example, by means of an electrical or optical signal in such a way that the light modulator presents a vortex phase distribution or an annular phase jump on its active surface in order to form a donut distribution or a bottle beam intensity distribution at the focus, respectively.

According to a further embodiment, the first light source is configured to generate luminescence inhibition light that modulates light emissions from emitters in the sample, wherein the luminescence microscope comprises a second light source configured to generate excitation light that induces light emissions from emitters in the sample. The luminescence inhibition light may be, for example, STED light, which converts fluorophores from the excited state back to the ground state by stimulated emission depletion, or switching light, which converts the fluorophores to a non-fluorescent dark state. To increase resolution below the diffraction limit, an excitation light focus in the sample may be combined with, for example, a STED light or switching light donut or bottle beam and scanned over the sample so that luminescent light is emitted only from the region of the minimum of the donut or bottle beam. This method is known in the prior art as STED microscopy or RESOLFT microscopy. With the luminescence microscope according to the first aspect, for example, an input beam of STED or switching light may be split into two output beams, which are then phase or amplitude modulated to form different light intensity distributions. In this way, for example, a STED donut and a STED bottle beam may be switched quickly to optimize lateral or axial resolution, respectively, or a STED donut and a STED bottle beam may be combined at the focus to optimize both lateral resolution and axial resolution.

According to a further embodiment, the first light source is configured to generate illumination light affecting light emissions from emitters in the sample, wherein a control unit of the luminescence microscope is configured to perform an illumination sequence with a plurality of illumination steps, wherein the sample is respectively illuminated with a light intensity distribution of the illumination light having a local minimum in the illumination steps, such that illumination positions in the sample are illuminated with different light intensities of the illumination light in the illumination steps, wherein the local minimum of the light intensity distribution is positioned in a region around a presumed position of an emitter in the sample in the illumination steps, and wherein the luminescence microscope comprises a detector and a computing unit, wherein the detector is configured to detect light emissions of the emitter for the respective illumination steps, and wherein the computing unit is configured to determine the position of the emitter in the sample from the light emissions detected for the respective illumination steps.

Such a method is also known as MINFLUX (when the illumination light is excitation light) or STED-MINFLUX (when the illumination light is STED light combined with a regular excitation light focus). In particular, the local minimum of the light intensity distribution of the illumination light is successively arranged at different illumination positions during an illumination sequence, forming a, particularly symmetric, illumination pattern arranged around, further in particular centered on, a previously estimated position of a single emitter. The MINFLUX or STED MINFLUX method may be performed iteratively, wherein the illumination sequence is performed in several iterations, wherein in each iteration the position of the emitter is estimated, and wherein the illumination pattern is arranged in each iteration around the previously estimated position.

Depending on the specific MINFLUX application (e.g., 2D or 3D localization, tracking an emitter), different light intensity distributions of the illumination light may be advantageous, e.g., a donut, a bottle beam, or a light distribution with an intensity minimum extending along a plane. Furthermore, in some MINFLUX or STED MINFLUX methods, pre-localization steps are performed in particular with a regular Gaussian focus of the illumination light.

With the luminescence microscope according to the first aspect, it is possible to quickly switch between such light intensity distributions or to combine the light intensity distributions at the focus as needed.

A second aspect of the present specification relates to a method for imaging a sample or for localizing or tracking emitters in a sample by means of a luminescence microscope, in particular according to the first aspect, wherein a first output light beam and/or a second output light beam is generated from an input light beam in a polarization-dependent manner by means of a first beam displacement element, wherein the first output light beam and the second output light beam form an angle of less than 90° with respect to each other when exiting the first beam displacement element, and wherein the first output light beam impinges on a first active surface of at least one light modulator, the first active surface being configured to modulate the first output light beam in its phase and/or its amplitude, in particular as a function of its polarization, and/or wherein the second output light beam impinges on a second active surface of at least one light modulator, the second active surface being configured to modulate the second output light beam in its the phase and/or its amplitude, in particular as a function of its polarization, and wherein the first output light beam modulated in its phase and/or in its amplitude and/or the second output light beam modulated in its phase and/or in its amplitude is or are focused into a sample, so that at least one light intensity distribution, in particular a light intensity distribution with a local minimum, further in particular an intensity zero, is formed in the sample.

According to a further embodiment, the first output light beam, after impinging on the first active surface, impinges on a third active surface of at least one light modulator, the third active surface being configured to modulate the first output light beam in its phase and/or in its amplitude, in particular as a function of its polarization, and/or wherein the second output light beam, after impinging on the second active surface, impinges on a fourth active surface of at least one light modulator, wherein the fourth active surface is configured to modulate the second output light beam in its phase and/or in its amplitude, in particular depending on its polarization.

According to a further embodiment, the input light beam is linearly polarized, wherein the polarization direction of the input light beam is adjusted by means of a switching element, in particular by means of a first polarization rotator, such that either the first output light beam or the second output light beam is formed at the first beam displacement element, so that either a first light intensity distribution is generated in the sample by focusing the first output light beam modulated in its phase and/or its amplitude, or a second light intensity distribution is generated in the sample by focusing the second output light beam modulated in its phase and/or its amplitude.

According to a further embodiment, the input light beam comprises a first linearly polarized component and a second linearly polarized component polarized orthogonally to the polarization direction of the first component, wherein the first component is modulated in its phase and/or in its amplitude by the first active surface or by the third active surface, and wherein the second component is modulated in its phase and/or in its amplitude by the second active surface or by the fourth active surface, in particular wherein the first component and the second component comprise a running difference with respect to each other which is greater than the coherence length of the light of the first component and the second component, wherein a combined light intensity distribution is generated in the sample by focusing the first output light beam and the second output light beam from the first component modulated in its phase and/or its amplitude and the second component modulated in its phase and/or its amplitude.

According to a further embodiment, luminescent light emanating from the sample is detected in the method, wherein an image of the sample is generated, or a position of a single emitter in the sample is determined, or a single emitter in the sample is tracked based on the detected luminescent light.

According to a further embodiment, illumination light, in particular excitation light and/or luminescence inhibition light, is scanned over the sample in the method, wherein the image of the sample is generated, or the position of the individual emitter is determined, or the individual emitter is tracked in the sample from luminescence light detected for different scan positions.

According to a further embodiment, luminescence prevention light is generated which modulates light emissions from emitters in the sample, and excitation light is generated which induces light emissions from the emitters in the sample, wherein in particular the input light beam is formed from the luminescence inhibition light, and wherein by the phase and/or amplitude modulation of the first output light beam and/or the second output light beam a light intensity distribution of the luminescence prevention light with a local minimum is formed at the focus, and wherein the light intensity distribution is superimposed with a focus of the excitation light.

According to a further embodiment, illumination light is generated which affects light emissions from emitters in the sample, wherein the input light beam is formed from the illumination light, and wherein a light intensity distribution of the illumination light with a local minimum is formed at the focus by phase and/or amplitude modulation of the first output light beam and/or the second output light beam, and wherein an illumination sequence comprising a plurality of illumination steps is performed, wherein the sample is illuminated in the illumination steps each with the light intensity distribution of the illumination light having a local minimum, such that illumination positions in the sample in the illumination steps are illuminated with different light intensities of the illumination light, wherein the local minimum of the light intensity distribution in the illumination steps is positioned in a region around a suspected position of an emitter in the sample, and wherein light emissions of the emitter are detected for the respective illumination steps, and wherein the position of the emitter in the sample is determined from the light emissions detected for the respective illumination steps.

Further features of the method according to the second aspect result from the features of the luminescence microscope according to the first aspect described above.

BRIEF DESCRIPTION OF THE FIGURES

FIG. 13-15 show a luminescence microscope according to the first aspect for polarization-dependent switching between four light distributions according to a fourth embodiment;

DESCRIPTION OF THE FIGURES

Figure 1:
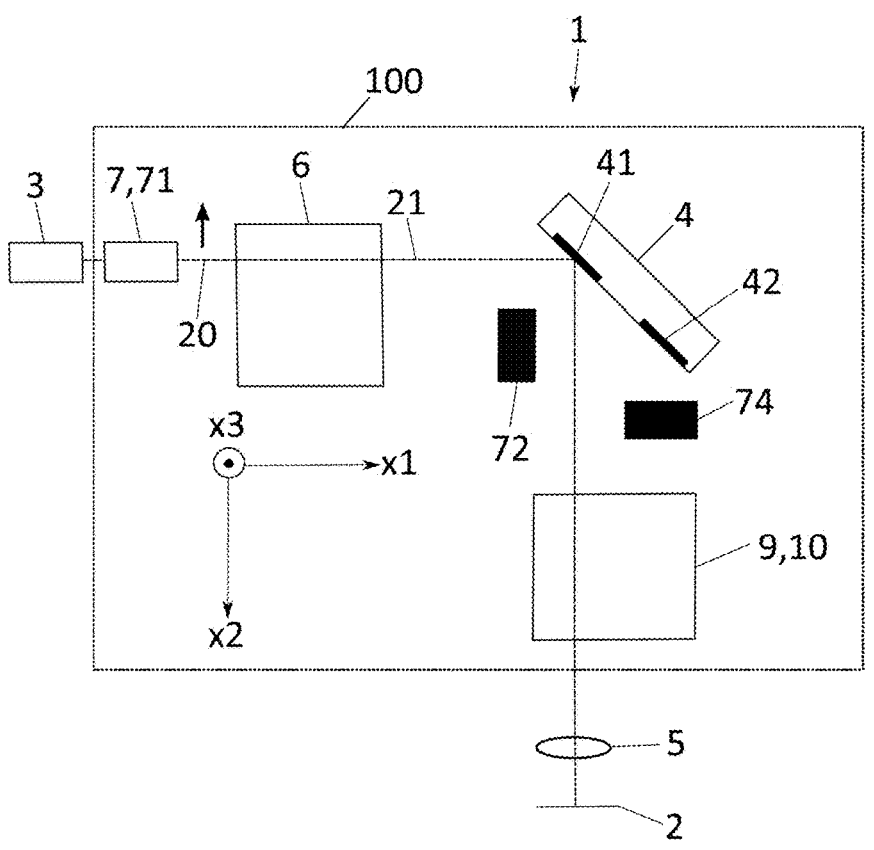
FIG. 1-2 show a luminescence microscope according to the first aspect for polarization-dependent switching between two light distributions.
Figure 2:
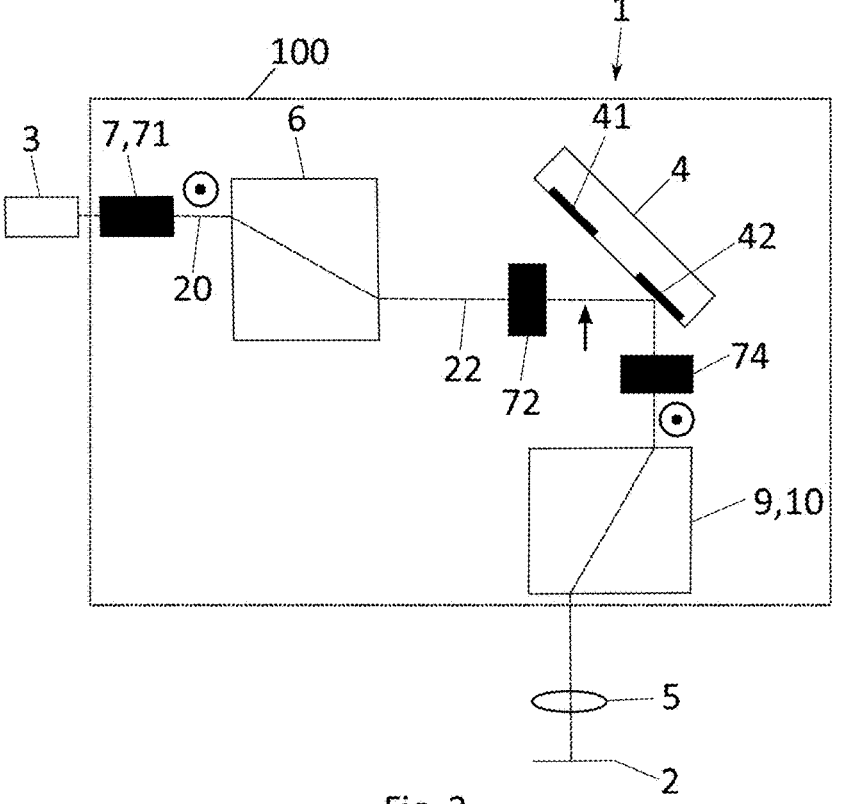

FIG. 1 and FIG. 2 show a luminescence microscope 1 with a light modulation module 100 for polarization-dependent switching between two light distributions in two different switching states comprising a switching element 7, a second polarization rotator 72, a fourth polarization rotator 74, a first beam displacement element 6, a light modulator 4 and an output beam combination unit 9. The luminescence microscope 1 comprises a light source 3 that generates a linearly polarized input light beam 20, wherein the switching element 7 is configured to rotate the polarization direction of the input light beam 20, and wherein the switching element 7 is connected to a control unit 11 (see FIGS. 18 and 20). When the switching element 7 receives a switching signal from the control unit 11, it rotates the polarization direction of the input light beam 20 by 90°.

In the embodiment shown, the light source 3 is configured in particular as a laser that generates a linearly polarized laser beam, and the switching element 7 is configured as a first polarization rotator 71, e.g., as a Pockels cell. Alternatively, the light source 3 may also comprise, for example, two lasers which generate linearly polarized light beams orthogonally to one another and which are selectively coupled into an optical fiber under the control of the switching element 7. First, second and fourth polarization rotators 71,72,74 which are controlled by a control unit 11 and are thus active are shown as filled symbols.

The input light beam 20 enters the first beam displacement element 6 in a first direction x1. If the input light beam 20 is linearly polarized in a preferred direction of the first beam displacement element 6 (FIG. 1), a first output light beam 21 is formed that is not deflected with respect to the input light beam 20. On the other hand, if the input light beam 20 is linearly polarized orthogonally to the preferred direction of the first beam displacement element 6 (FIG. 2), a second output light beam 22 is formed which is parallel to the input light beam 20 but offset along a second direction x2 perpendicular to the first direction x1.

The first beam displacement element 6 may, for example, consist of a birefringent crystal, which may in particular be configured as a so-called calcite displacer.

The light modulator 4 comprises a first active surface 41 and a second active surface 42 and is arranged relative to the first beam displacement element 6 such that the first output light beam 21 impinges on the first active surface 41 (FIG. 1) and the second output light beam 22 impinges on the second active surface 42 (FIG. 2).

In the beam path of the second output light beam 22, the second polarization rotator 72 is arranged between the first beam displacement element 6 and the second active surface 42, which rotates the polarization direction of the second output light beam 22 by 90° so that both output light beams 21, 22 have the same polarization direction when they impinge on the first active surface 41 and the second active surface 42, respectively. The second polarization rotator 72 is configured in particular as a passive polarization rotator 72, e.g., as a λ/2 plate.

As sketched in FIG. 1 and FIG. 2, the first output light beam 21 and the second output light beam 22 are phase modulated upon diffraction or reflection at the first active surface 41 and the second active surface 42, respectively. In particular, the light modulator 4 is a spatial light modulator (SLM) with controllable pixels by means of which a variable phase pattern is superimposed with a blaze grating on the first active surface 41 and the second active surface 42, respectively. The rays emitted from the first active surface 41 and the second active surface 42 can be the light rays diffracted at the blaze grating in the first order. The light modulator 4 modulates the phase of the light rays incident on the first active surface 41 and the second active surface 42, in particular, in a polarization-dependent manner, i.e., the light modulator 4 has a preferred direction, with light that is linearly polarized in the preferred direction having its phase modulated and light that is linearly polarized orthogonally to the preferred direction not having its phase modulated. In the embodiment shown in FIG. 1 and FIG. 2, the first active surface 41 and the second active surface 42 have the same preferred direction, which coincides with the polarization direction of the first output beam 21. The second polarization rotator 72 therefore serves here to also rotate the polarization direction of the second output light beam 22 into the preferred direction, so that the second output light beam 22 is phase modulated by the second active surface 42.

The first active surface 41 and the second active surface 42 are each arranged at least approximately in a pupil plane that is conjugate to the pupil of the objective lens 5, i.e., represents a Fourier plane with respect to the focal plane in the sample 2.

According to the embodiment shown in FIG. 1 and FIG. 2, the output beam combination unit 9 is configured as a second beam displacement element 10 (e.g., as a second calcite displacer) and is arranged in the opposite orientation in the beam path of the luminescence microscope 1 as the first beam displacement element 6.

In order for the second beam displacement element 10 to redirect the first output light beam 21 and the second output light beam 22 into the same combined beam path, they must be linearly polarized orthogonally to each other. Therefore, a fourth polarization rotator 74 is arranged in the beam path of the second output light beam 22 between the light modulator 4 and the second beam displacement element 10, which rotates the polarization direction of the second output light beam 22 back to the original direction. According to the embodiment shown in FIG. 1 and FIG. 2, the fourth polarization rotator 74 is in particular a passive polarization rotator, e.g., an λ/2 plate.

After passing through the second beam displacement element 10, the first output light beam 21 or the second output light beam 22 is focused by an objective lens 5 into a sample 2, forming a light distribution at the focus. The light distribution depends on the phase distribution that is imposed on the first output light beam 21 or the second output light beam 22 by the first active surface 41 or the second active surface 42, respectively.

In particular, light distributions with a local minimum, e.g., a donut or a bottle beam, may be generated at the focus by setting suitable phase patterns, such as those used in STED microscopy and MINFLUX microscopy.

The luminescence microscope 1 according to the first aspect as shown in FIG. 1 and FIG. 2 thereby offers the possibility of switching between two different light distributions by switching the input polarization with the switching element 7, in particular the first polarization rotator 71, so that alternatively the first output light beam 21 or the second output light beam 22 is formed. The first active surface 41 and the second active surface 42 thereby represent, in particular statically, different phase patterns which produce different light distributions at the focus. Compared to changing the phase pattern by controlling the light modulator 4, this has the advantage that it is possible to switch between two light distributions much faster, especially when using a Pockels cell as the first polarization rotator 71 with response times in the nanosecond range.

Figures 3, 4:
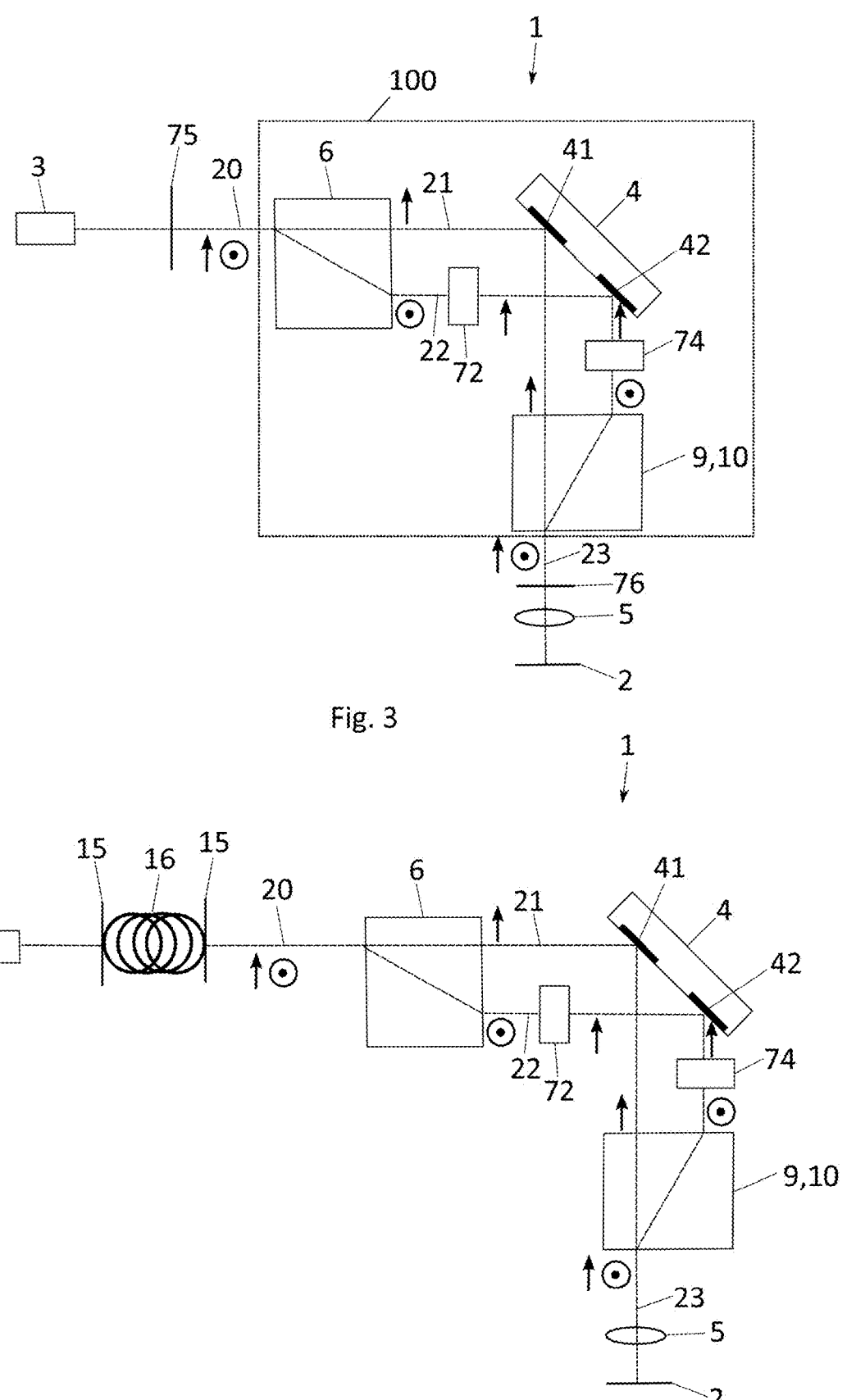
FIG. 3 shows a luminescence microscope according to the first aspect for superimposing two light distributions.
FIG. 4 shows a further luminescence microscope according to the first aspect for superimposing two light distributions.

FIG. 3 and FIG. 4 show two embodiments of a luminescence microscope 1 according to the first aspect for superimposing two light distributions at the focus, which comprise, like the luminescence microscope 1 shown in FIG. 1 and FIG. 2, a light modulation module 100 with a first beam displacement element 6 for generating a first output light beam 21 and a second output light beam 22 from an input light beam 20, a light modulator 4 with a first active surface 41 for phase modulation of the first output light beam 21 and a second active surface 42 for phase modulation of the second output light beam 22, a second, particularly passive, polarization rotator 72 arranged between the first beam displacement element 6 and the second active surface 42 for rotating the polarization direction of the second output light beam 22, an output beam combination unit 9 configured as a second beam displacement element 10, and a fourth, particularly passive, polarization rotator 74 arranged between the second active surface 42 and the output beam combination unit 9 for rotating the polarization direction of the second output light beam 22 in the initial direction.

However, unlike the light modulation module 100 shown in FIG. 1 and FIG. 2, no switching element 7 is provided. Instead, an input light beam 20 is generated with two linearly polarized components with mutually orthogonal polarization directions, and the first beam displacement element 6 splits these components into the first output light beam 21 and the second output light beam 22.

According to the example shown in FIG. 3, the linearly polarized input light beam 20 emanating from the light source 3 is rotated by a fifth polarization rotator 75, in particular an λ/2 plate, so that its polarization direction is at an acute angle, in particular of 45°, relative to the preferred direction of the first beam displacement element 6. This ensures that the input light beam 20 is split by the first beam displacement element 6 into the first output light beam 21 and the second output light beam 22.

In the example according to FIG. 4, the light from the light source 3 is coupled into a birefringent optical fiber 16 via a fiber coupler 15, which splits the light from the light source 3 into two linearly polarized components orthogonal to each other, wherein the components are delayed with respect to each other by more than the coherence length, so that the components contain incoherent light with respect to each other. Both components form the input light beam 20, which is split by the first beam displacement element 6 into two parallel beams, namely the first output light beam 21 and the second output light beam 22.

In both embodiment examples (FIG. 3 and FIG. 4), the first output light beam 21 and the second output light beam 22 travel parallel to each other via the light modulator 4, with the first output light beam 21 being phase modulated by the first active surface 41 and the second output light beam 22 being phase modulated by the second active surface 42. Subsequently, the modulated first output light beam 21 and the modulated second output light beam 22 are combined by the output beam combination unit 9 to form a combined output light beam 23 and focused into the sample 2 by the objective lens 5. Thereby, a superposition of a first light distribution generated by the first output light beam 21 and a second light distribution generated by the second output light beam 22 is formed.

In the example shown in FIG. 4, the first output light beam 21 and the second output light beam 22 are incoherent, ensuring that the two light distributions combined at the focus do not interfere.

The luminescence microscope 1 according to FIG. 3 additionally comprises an optional sixth polarization rotator 76, in particular an λ/4 plate, in front of the objective lens 5, which circularly polarizes the first output light beam 21 and the second output light beam 22. Due to the orthogonal linear polarization, one of the output light beams 21,22 is thereby left-handed circularly polarized, while the other of the output light beams 21,22 is right-handed circularly polarized. As a result, the lateral components of the respective light distributions do not interfere, although the output light beams 21,22 originate from the same light source 3 and are not delayed with respect to each other by more than the coherence length. The axial components of the light distributions may interfere in this setup. However, this is not relevant for the resulting light distribution, for example, if one of the light distributions along the optical axis has an intensity minimum, in particular an intensity zero, e.g., in the case of a 2D donut.

With the luminescence microscopes 1 shown in FIG. 3 and FIG. 4, for example, a STED donut can be superimposed on a STED bottle beam in STED microscopy, as known from the prior art, in order to simultaneously optimize the lateral resolution and the axial resolution. In comparison to the solutions known from the prior art, in which two light beams polarized orthogonally to each other are jointly guided one after the other over two active surfaces of a light modulator 4, with the polarization of both beams being rotated between the surfaces, no lateral offset of the light beams occurs in the solution according to the aspects described herein.

FIG. 5 to FIG. 8 show a further embodiment of the luminescence microscope 1 according to the first aspect for switching between four different light distributions at the focus. It comprises a light modulation module 100 with a switching element 7, a first beam displacement element 6, a second polarization rotator 72, a third polarization rotator 73, a fourth polarization rotator 74, two light modulators 4a,4b and an output beam combination unit 9. FIG. 5 to FIG. 8 show four different switching states of the luminescence microscope 1.

The luminescence microscope 1 comprises a light source 3 which generates a linearly polarized input light beam 20. The switching element 7 is configured as a first polarization rotator 71, e.g., a Pockels cell, which rotates the polarization direction of the input light beam 20 by 90° upon receiving a switching signal. The input light beam 20 is deflected by the first beam displacement element 6, e.g., a birefringent crystal such as a calcite displacer, depending on its polarization direction to form either the first output light beam 21 or the second output light beam 22. The first light modulator 4a comprises the first active surface 41 and the second active surface 42, and the second light modulator 4b comprises the third active surface 43 and the fourth active surface 44. The first light modulator 4a and the second light modulator 4b are arranged such that the first output light beam 21 first impinges on the first active surface 41 and then on the third active surface 43, and that the second output light beam 22 first impinges on the second active surface 42 and then on the fourth active surface 44.

According to the example shown in FIG. 5 to FIG. 8, the light modulators 4a,4b modulate the phase of the light rays reflected or diffracted at the respective active surfaces 41,42, 43,44 in a polarization-dependent manner. Therein, the active surfaces 41,42,43,44 comprise the same preferred direction, thus modulating linearly polarized light with a polarization direction that is parallel to the preferred direction, whereas light with a polarization direction that is orthogonal to the preferred direction is not modulated. The preferred direction of both light modulators 4a,4b coincides with the polarization direction of the first output light beam 21 in the example shown in FIG. 5 to FIG. 8.

The active surfaces 41,42,43,44 are all positioned at least approximately in a pupil plane of the objective lens 5. If required, the luminescence microscope 1 may comprise optical relays known to the skilled person to ensure this (not shown).

The light modulators 4a,4b may be, for example, SLMs with blaze gratings and controllable pixels, using the phase-modulated light of the first diffraction order to generate the light distributions.

A switchable second polarization rotator 72, e.g., a Pockels cell, is positioned between the first beam displacement element 6 and the first light modulator 4a. In addition, a passive third polarization rotator 73 is positioned between the first light modulator 4a and the second light modulator 4b. The second polarization rotator 72 and the third polarization rotator 73 respectively cover the optical path of the first output light beam 21 and the second output light beam 22. Alternatively, a second polarization rotator 72 and a third polarization rotator 73 may be associated with each of the first output light beam 21 and the second output light beam 22.

The first output light beam 41 and the second output light beam 42 are redirected into a common beam path by the output beam combination unit 9, which is configured as a second beam displacement element 10. Between the second light modulator 4b and the output beam combination unit 9 the switchable fourth polarization rotator 74, e.g., a Pockels cell, is arranged, which covers the beam path of the first output light beam 21 and the second output light beam 22. Alternatively, two separate fourth polarization rotators 74 may be provided in these beam paths.

The phase modulated output beams 21,22 are finally focused by the objective lens 5 into the sample 2, where a different light distribution is formed depending on the active surface 41,42,43,44 from which the respective output beam 21,22 was phase modulated.

In the following, four different switching states of the luminescence microscope 1 are now described, which are shown in FIG. 5 to FIG. 8, respectively. First, second and fourth polarization rotators 71,72,74, which are controlled by a control unit 11 and are thus active, as well as the passive third polarization rotator 73, which performs its function independently of a switching signal, are shown here as filled symbols.

Figures 5, 6:
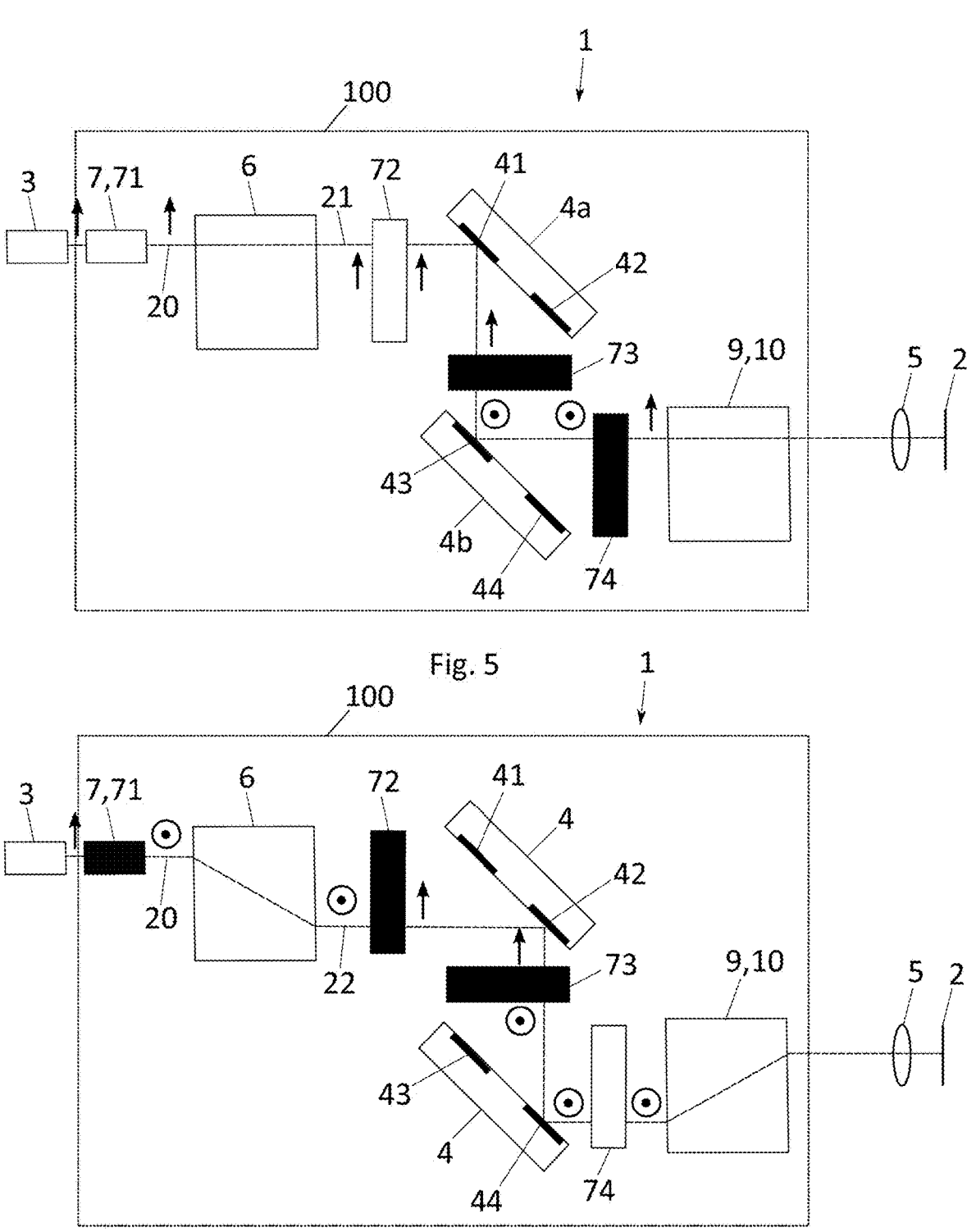
FIG. 5-8 show a luminescence microscope according to the first aspect for polarization-dependent switching between four light distributions according to a first embodiment.

In the configuration shown in FIG. 5, the first polarization rotator 71 does not receive a switching signal so that the input light beam 20 maintains its polarization direction and thus the non-displaced, first output light beam 21 is formed by the first beam displacement element 6. The second polarization rotator 72 is also inactive, so that the first output light beam 21 maintains its polarization direction and is therefore phase modulated by the first active surface 41 of the first light modulator 4a. Subsequently, the polarization direction of the first output light beam 21 is rotated 90° by the passive third polarization rotator 73. The first output light beam 21 is then reflected by the third active surface 43 of the second light modulator 4b but is not phase modulated because its polarization direction is orthogonal to the preferred direction of the second light modulator 4b. In order for the first output light beam 21 to pass through the second beam displacement element 10 without deflection, it must be rotated back to its original polarization direction. For this purpose, a switching signal is sent to the fourth polarization rotator 74. A light distribution is thus created in the sample 2 by phase modulation of the first output light beam 21 at the first active surface 41.

In the switching state shown in FIG. 6, the first polarization rotator 71 and the second polarization rotator 72 are activated, and the fourth polarization rotator 74 is inactive. Therefore, the second output light beam 22 is formed by displacement at the first beam displacement element 6. Its polarization direction is then rotated by the second polarization rotator 72 so that it corresponds to the preferred direction of the first light modulator 4a. Accordingly, the second output light beam 22 is phase modulated by the second active surface 42. Subsequently, the polarization direction is again rotated by the passive third polarization rotator 73 so that the second output light beam 22 is reflected from the fourth active surface 44 but is not phase modulated. The second output light beam 22 is deflected by the second beam displacement element 10 and finally focused into the sample 2 by the objective lens 5. In this process, a light distribution is formed corresponding to the phase pattern displayed on the second active surface 42.

Figures 7, 8:
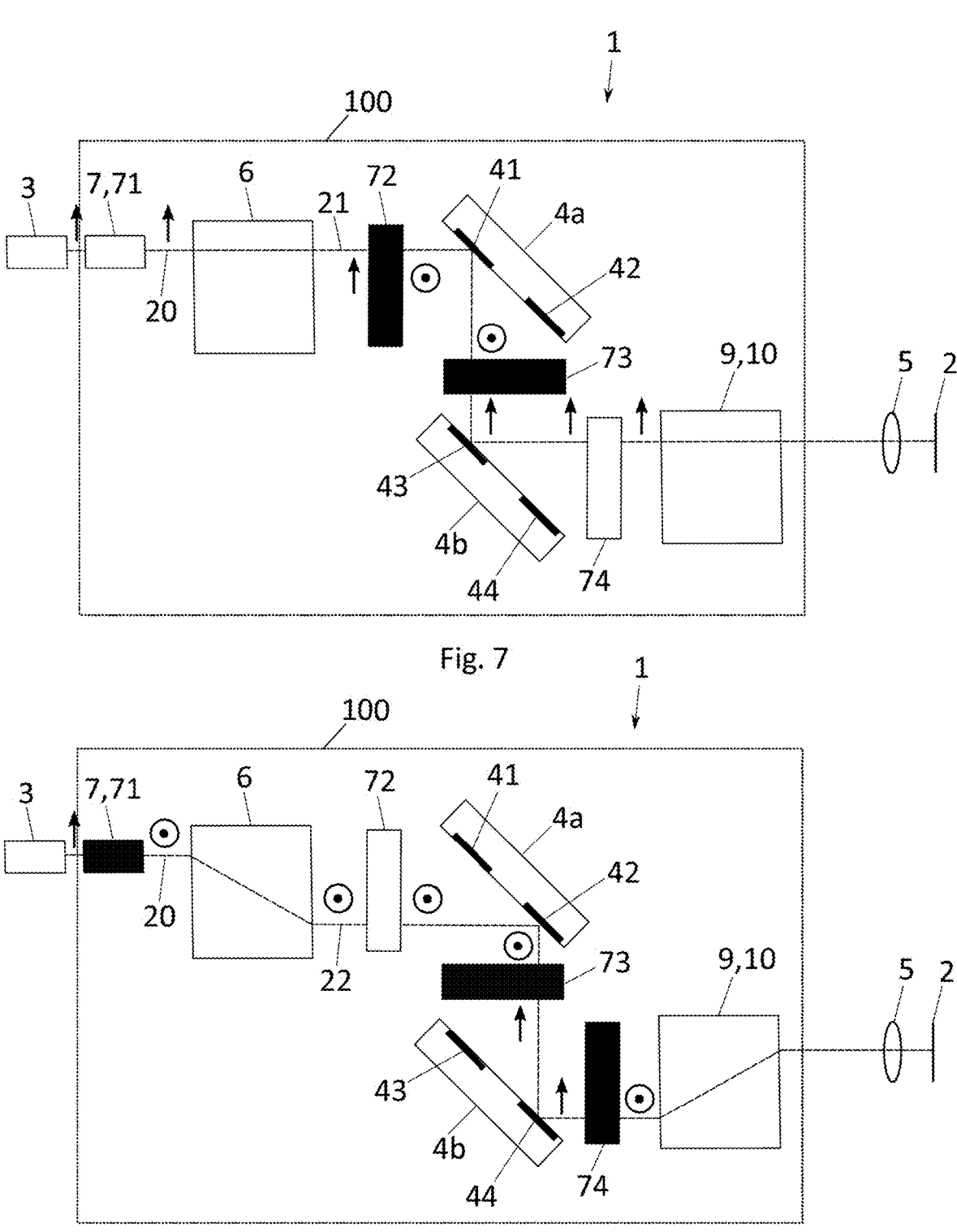

FIG. 7 shows another switching state in which only the second polarization rotator 72 is activated. The first polarization rotator 71 and the fourth polarization rotator 74 remain inactive. In this way, the first output light beam 21 is obtained and its polarization direction is rotated before it hits the first active surface 41, so that the first output light beam 21 is not phase modulated by the first active surface 41. Only after its polarization direction is rotated again by the passive third polarization rotator 73 does it coincide with the preferred direction of the second light modulator 4b, so that the first output light beam 21 is phase modulated by the third active surface 43. After running through the second beam displacement element 10, the first output light beam 21 is focused by the objective lens 5 into the sample 2, resulting in a light distribution corresponding to the phase pattern shown on the third active surface 43.

FIG. 8 shows the case where the first polarization rotator 71 is turned on to rotate the polarization direction of the input light beam 20. Therefore, the input light beam 20 is displaced by the first beam displacement element 6, forming the second output light beam 22. Since the second polarization rotator 72 is inactive, the second output light beam 22 impinges on the second active surface 42 with a polarization direction that is orthogonal to the preferred direction of the first light modulator 4a. Therefore, the second output light beam 22 is only reflected by the second active surface 42 but is not phase modulated. The second output light beam 22 then passes through the passive third polarization rotator 73 so that its polarization direction, when incident on the fourth active surface 44, corresponds to the preferred direction of the second light modulator 4b. Consequently, the second output light beam 22 is phase modulated by the fourth active surface 44. Finally, the polarization direction of the second output light beam 22 is rotated back to its initial direction by the fourth polarization rotator 74, and the second output light beam 22 is displaced by the second beam displacement element 10 and focused into the sample 2 by the objective lens 5. Thus, a light distribution corresponding to the phase pattern shown on the fourth active surface 44 is formed.

It can be seen from FIG. 5 to FIG. 8 that the fourth polarization rotator 74 must be activated whenever the second polarization rotator 72 is inactive in order for the second beam displacement element 10 to perform its function as an output beam combination unit 9.

Figure 9:
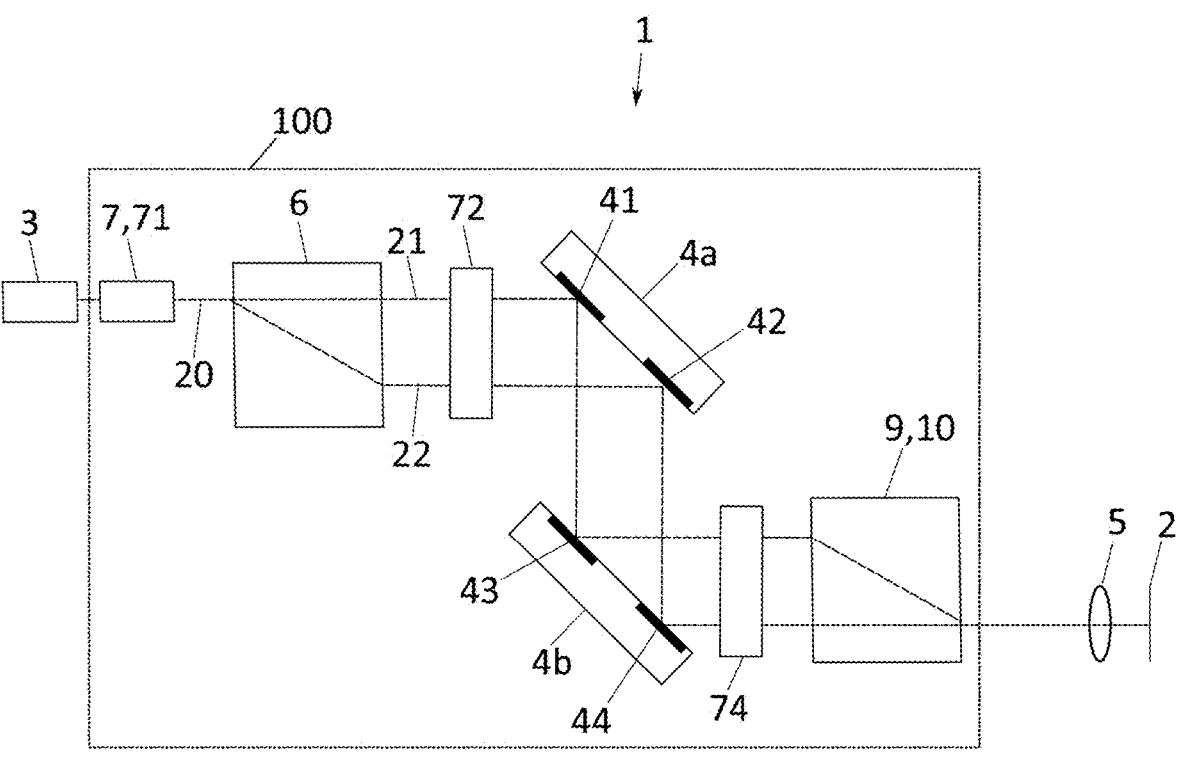
FIG. 9 shows a luminescence microscope according to the first aspect for polarization-dependent switching between four light distributions according to a second embodiment.

FIG. 9 shows a further embodiment of the luminescence microscope 1 according to the first aspect, which differs from the luminescence microscope 1 shown in FIG. 5 to FIG. 8 only in that the preferred directions of the first light modulator 4a and the second light modulator 4b are perpendicular to each other. Therefore, the third, passive, polarization rotator 73 between the first active surface 41 and the third active surface 43 and between the second active surface 42 and the fourth active surface 44 can be omitted. The remaining components are identical to those of the luminescence microscope 1 shown in FIG. 5 to FIG. 8, and these are marked with the same reference signs. With the luminescence microscope 1 according to FIG. 9, it is possible to switch rapidly between four different light distributions at the focus in the same way as with the embodiment described in FIG. 5 to FIG. 8 by controlling the first, second and fourth polarization rotators 71,72,74.

Figure 10:
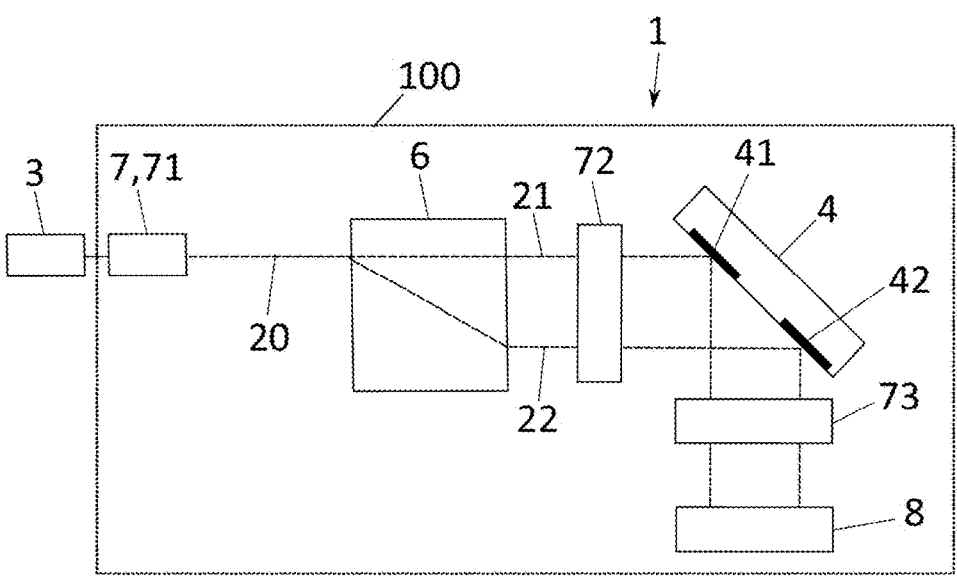
FIG. 10-12 show a luminescence microscope according to the first aspect for polarization-dependent switching between four light distributions according to a third embodiment.
Figure 11:
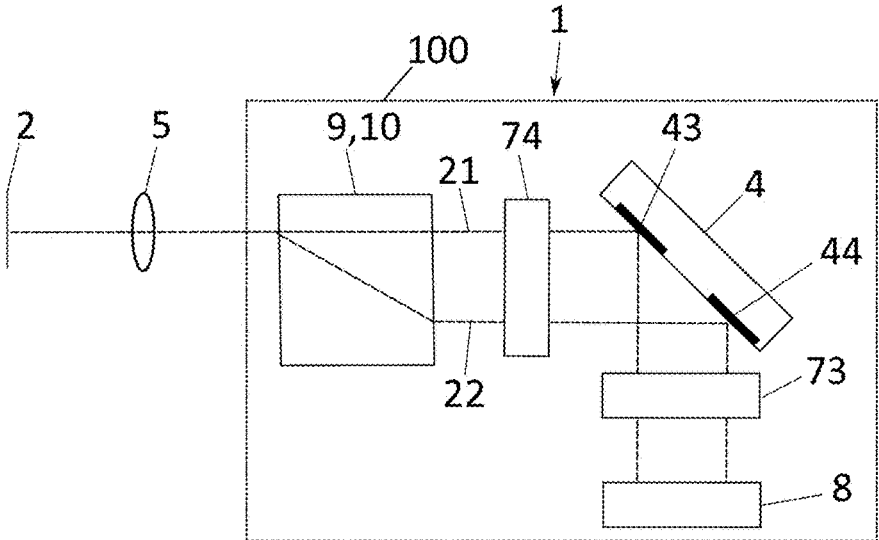
Figure 12:
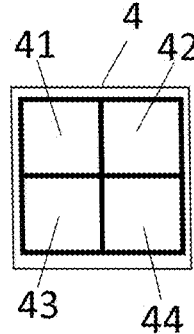

FIG. 10 to FIG. 12 illustrates another embodiment of the luminescence microscope 1 according to the first aspect, comprising a light modulation module 100 with only one light modulator 4 forming the first active surface 41, the second active surface 42, the third active surface 43 and the fourth active surface 44. These form a rectangular arrangement on a surface of the light modulator 4 (see FIG. 12, shown in the plane of the common active surface of the light modulator 4, which comprises the active surfaces 41,42,43, 44 as partial areas). The light modulation module 100 further comprises the switching element 7, the second polarization rotator 72, the third polarization rotator 73, the fourth polarization rotator 74, a reflection element 8, and an output beam combination unit 9.

FIG. 10 is a representation in a plane spanned by the first output light beam 21 and the second output light beam 22 as they emerge from the first beam displacement element 6. The input light beam 20 is split into one of the output light beam 21 or the second output light beam 22 by the first beam displacement element 6 in a polarization-dependent manner depending on the switching state of the switching element 7. The polarization direction of the output beams 21,22 can be rotated by 90° by controlling the switchable second polarization rotator 72. The first output light beam 21 is incident on the first active surface 41 and the second output light beam 22 is incident on the second active surface 42. Depending on their polarization direction, the output light beams 21,22 are phase modulated or merely reflected.

The reflection element 8, which may be configured as a mirror or roof prism, for example, is tilted relative to an active surface of the light modulator 4 (i.e. is not parallel to this surface), reflects the first output light beam 21 emanating from the first active surface 41 in a direction having a component into the drawing plane of FIG. 10, onto the third active surface 43 and reflects the second output light beam 22 emanating from the second active surface 42 correspondingly onto the fourth active surface 44. A passive third polarization rotator 73 is arranged between the light modulator 4 and the reflection element 8, through which the first output light beam 21 and the second output light beam 22 pass twice during reflection at the reflection element 8. The third polarization rotator 73 is in particular a λ/4 plate which rotates the first output light beam 21 and the second output light beam 22 by 90° when they pass through it twice.

FIG. 11 depicts the luminescence microscope 1 in a plane of the output light beams 21,22 traveling from the third active surface 43 and the fourth active surface 44 toward the output beam combination unit 10.

The first output light beam 21 and the second output light beam 22 pass through the fourth polarization rotator 74 and are coupled into a common beam path by the output beam combination unit 9 formed as the second beam displacement element 10 and are focused into the sample 2 by the objective lens 5.

With the embodiment according to FIG. 10 to FIG. 12, as with the previously described embodiments according to FIG. 5 to FIG. 8 and FIG. 9, it is possible to switch between four light distributions by controlling the switching element 7, in particular the first polarization rotator 71, the second polarization rotator 72 and the fourth polarization rotator 74. This results in the additional advantage that all four active surfaces are formed by a single light modulator 4, so that in particular the complexity, the installation space and the adjustment effort are reduced.

FIG. 13 to FIG. 15 show a fourth embodiment of the luminescence microscope 1 for switching between four light distributions, comprising a light modulation module 100 comprising a single light modulator 4 with four active surfaces 41,42,43,44, a first beam displacement element 6, a switching element 7, a second polarization rotator 72, a third polarization rotator 73, a fourth polarization rotator 74, a reflection element 8, and an output beam combination unit 9. Therein, FIGS. 10 and 11 represent planes spanned by the first direction x1 and the second direction x2, respectively, which are shifted along the third direction x3 perpendicular to the first direction x1 and the second direction x2.

In FIG. 15, the light modulator 4 is shown with the first active surface 41, the second active surface 42, the third active surface 43, and the fourth active surface 44 in a plane parallel to the third direction x3.

The first beam displacement element 6 deflects the linearly polarized input light beam 20 depending on its polarization direction in the third direction x3, thus splitting the input light beam 20 into a first output light beam 21 (see FIG. 13) and a second output light beam 22 (see FIG. 14).

FIG. 13 shows the beam path of the first output light beam 21. It passes through the second polarization rotator 72 and is deflected by the first active surface 41. The deflected beam is reflected at the reflection element 8 and passes twice through the passive third polarization rotator 73, which is configured in particular as a λ/4 plate and thus rotates the polarization direction of the first output light beam 21 by 90°. Subsequently, the first output light beam 21 is deflected by the third active surface 43, passes through the fourth polarization rotator 74 and the output beam combination unit 9 configured as the second beam displacement element 10, and is focused into the sample 2 by the objective lens 5. Depending on its polarization direction, which can be changed by controlling the switchable second polarization rotator 72, the phase of the first output light beam 21 is thereby modulated by the first active surface 41 or the third active surface 43, so that a corresponding light distribution is generated at the focus in the sample 2.

In particular, the third polarization rotator 73 is connected to the reflection element 8. This reduces the required installation space.

The beam path of the second output light beam 22 deflected by the first beam displacement element 6 is shown in FIG. 14. The second output light beam 22 passes through the second polarization rotator 72, impinges on the second active surface 42 of the light modulator 4, is reflected by the reflection element 8, wherein the polarization direction of the second output light beam 22 is rotated by 90° when passing twice through the passive third polarization rotator 73. Subsequently, the second output light beam 22 passes through the fourth polarization rotator 74 and is coupled back into the beam path shown in FIG. 13 by the output beam combination unit 9 and focused into the sample 2 by the objective lens 5.

Depending on the switching state of the second polarization rotator 72, the second output light beam 22 is phase modulated by the second active surface 42 or by the fourth active surface 44.

Figure 16:
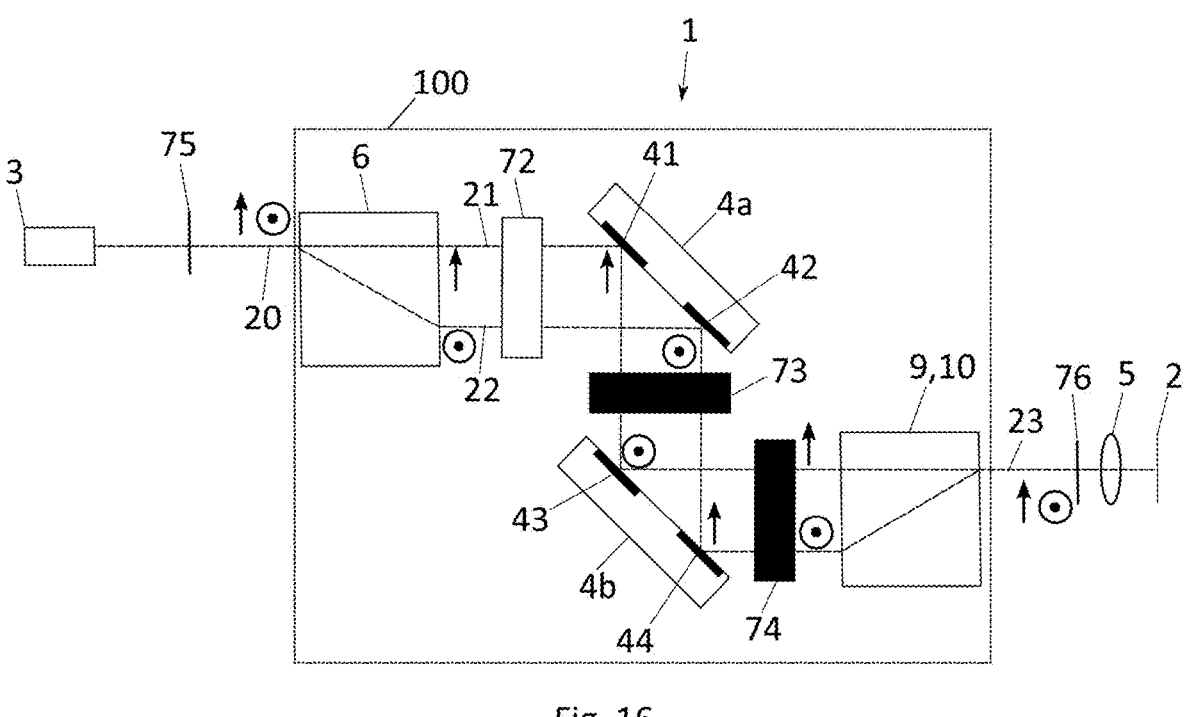
FIG. 16-17 show a luminescence microscope according to the first aspect for polarization-dependent switching between different combinations of light distributions.
Figure 17:
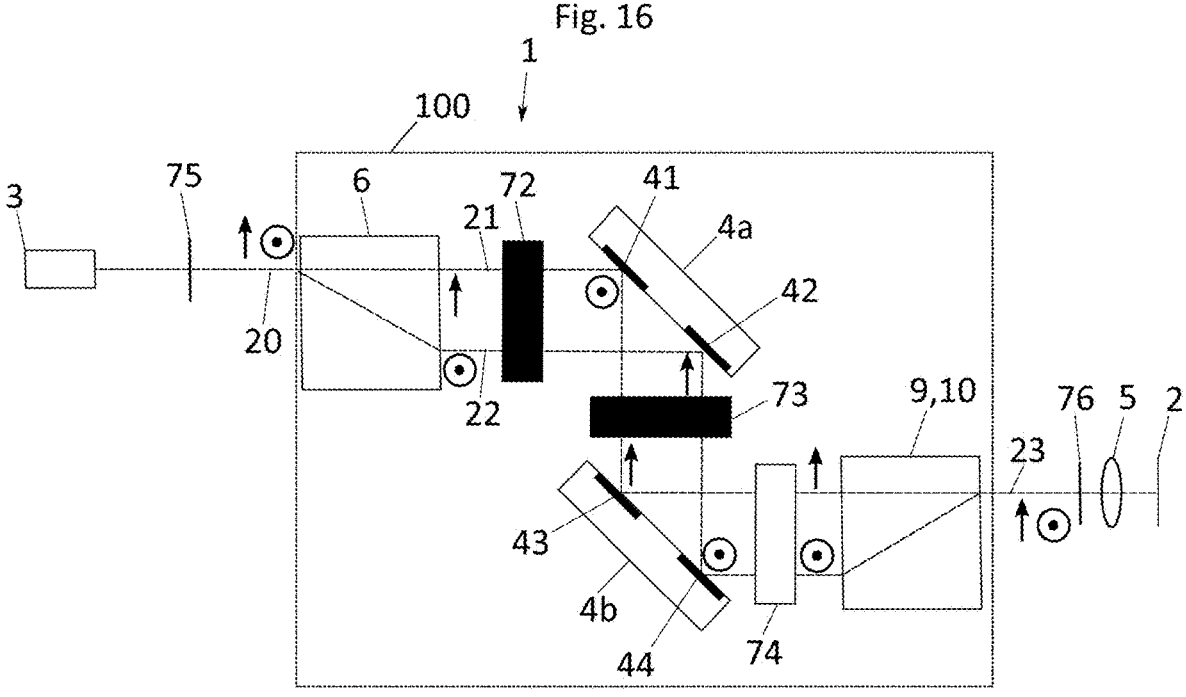

FIG. 16 and FIG. 17 show an embodiment of the luminescence microscope 1 with which it is possible to switch rapidly between different combinations of superimposed light distributions. The apparatus structure corresponds to the embodiment of the luminescence microscope 1 shown in FIG. 5 to FIG. 8 (identical components are marked with identical reference signs), wherein no first polarization rotator 71 is provided, but wherein the luminescence microscope 1 comprises, analogously to the example shown in FIG. 3, a fifth polarization rotator 75, in particular a λ/2 plate, for rotating the polarization direction of the linearly polarized input light beam 20 so that it is at an acute angle, in particular 45°, to the preferred direction of the first beam displacement element 6. In addition, a sixth polarization rotator 76, in particular a λ/4 plate, is provided in front of the objective lens 5, which circularly polarizes the combined output light beam 23. Alternatively, of course, the setup shown in FIG. 4 with an optical fiber 16 with fiber couplers 15 may be used, wherein the light from the light source 3 is split into two incoherent components polarized orthogonally to each other (see also description for FIG. 4).

FIG. 16 shows a configuration in which the second polarization rotator 72 is not actuated. Therefore, the polarization direction of the first output light beam 21 corresponds to the preferred direction of the first light modulator 4a and the first output light beam 21 is phase modulated by the first active surface 41. After the polarization direction is rotated by the passive third polarization rotator 73, the first output light beam 21 is polarized orthogonally to the preferred direction of the second light modulator 4b, so that the first output light beam 21 is not phase modulated by the third active surface 43, but only reflected. The second output light beam 22 is initially polarized orthogonally to the preferred direction of the first light modulator 4a, and thus is not phase modulated by the second active surface 42. After the polarization direction is rotated by the third polarization rotator 73, the polarization direction of the second output light beam 22 corresponds to the preferred direction of the second light modulator 4b, so that the second output light beam 22 is phase modulated by the fourth active surface 44. The fourth polarization rotator 74 is activated by a switching signal to reverse the polarization direction of the two output light beams 21,22 to the initial direction so that the output light beams 21,22 are combined by the second beam displacement element 10 to form a combined output light beam 23, which is then focused by the objective lens 5 into the sample 2. This forms a superposition of two light distributions at the focus, corresponding respectively to the phase patterns shown on the first active surface 41 and the fourth active surface 44.

In FIG. 17, the situation is sketched in which the second polarization rotator 72 is activated by a control signal. As a result, the first output light beam 21 is phase modulated by the third active surface 43 of the second light modulator 4b and the second output light beam 22 is phase modulated by the second active surface 42 of the first light modulator 4a. In this case, the polarization directions of the output light beams 21,22 already correspond to the initial direction after being deflected by the second light modulator 4b due to being rotated twice by the second polarization rotator 72 and the third polarization rotator 73, so that the second beam displacement element 10 combines the first output light beam 21 and the second output light beam 22 to form the combined output light beam 23 without having to actuate the fourth polarization rotator 74. Thus, at the focus, there is a superposition of light distributions corresponding to the phase patterns shown on the second active surface 42 and the third active surface 43.

In an analogous manner, the embodiments according to FIG. 9, FIG. 10 to FIG. 12 or FIG. 13 to FIG. 15 may also be used for switching between different combinations of two light distributions superimposed on each other.

Figure 18:
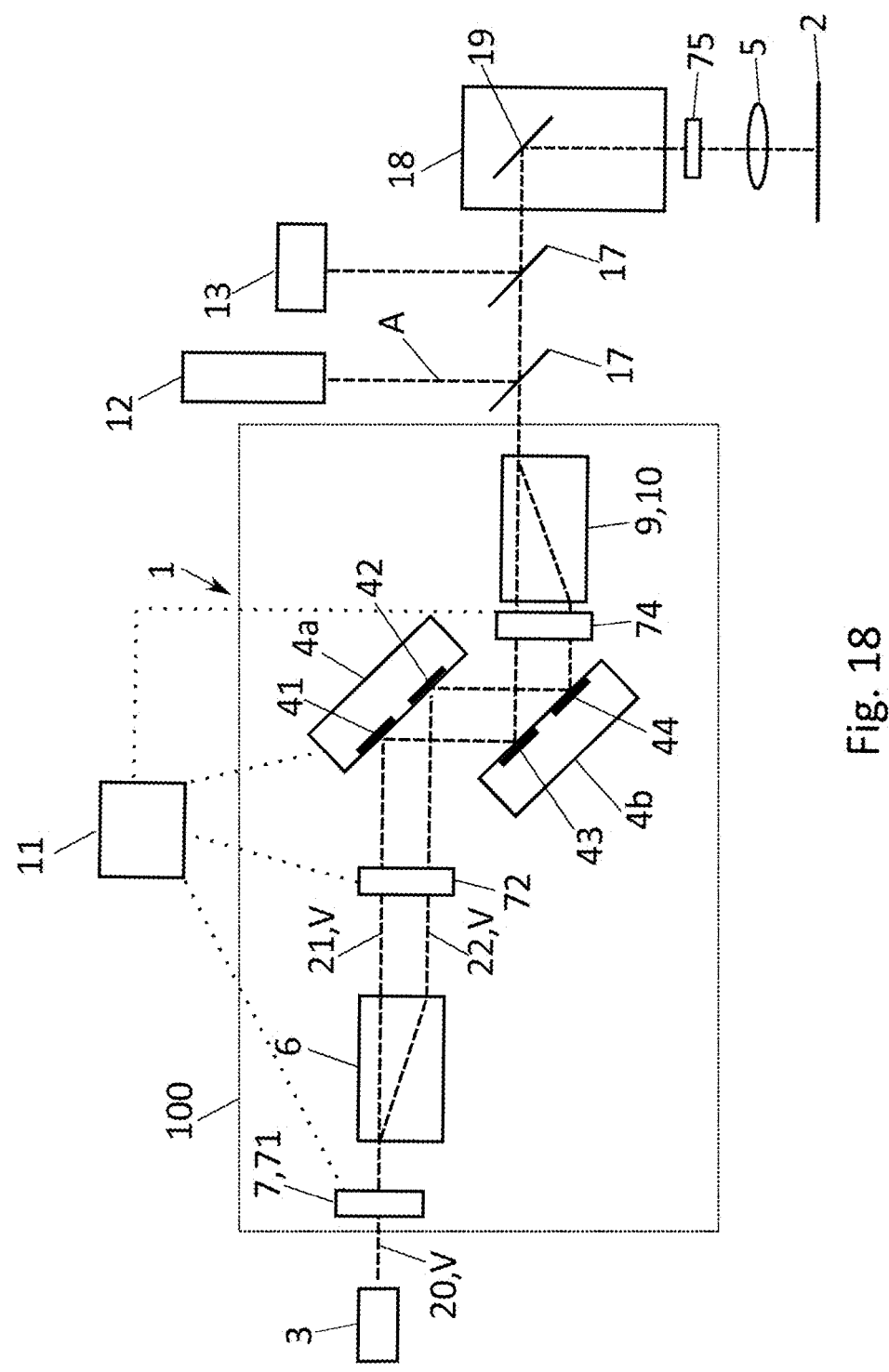
FIG. 18 shows a STED microscope according to the first aspect for polarization-dependent switching between four light distributions.

FIG. 18 shows a luminescence microscope 1 according to the first aspect configured as a STED microscope, which comprises the light modulation module 100 shown in FIG.

5 to FIG. 8 and described further above. The STED microscope comprises a first light source 3 for generating linearly polarized luminescence inhibition light V (here STED light), which is phase modulated by the light modulation module 100 to switch between four different STED light distributions with a local minimum at the focus in the sample 2. These may be, for example, a STED donut, a STED bottlebeam, and two STED light distributions with intensity minima extending along different planes.

Furthermore, the STED microscope comprises a second light source 12 for generating excitation light A. The modulated STED light beam and the excitation light beam are combined at a beam splitter 17 and together pass through a scanner 18, which scans the combined light beam focused by the objective lens 15 over the sample 2. The scanner 18 may be, for example, a galvo scanner with a pivotable mirror 19. Although only one mirror 19 is shown in FIG. 18, the scanner 18 preferably comprises multiple mirrors to scan the combined light beam across the sample in multiple spatial directions.

A sixth polarization rotator 76, in particular an λ/4 plate, is arranged between the scanner 18 and the objective lens 5 to circularly polarize the STED light and the excitation light.

Luminescence light emanating from the sample 2 enters the luminescence microscope 1 via the objective lens 5, is de-scanned by the scanner 18 and passes via a further beam splitter 17 (e.g., a dichroic mirror) to a detector 13, in particular a confocal detector 13. A microscopic image of the sample 2 is generated by a computing unit (not shown) from the light intensities detected by the detector 13 for the various scanning positions. 1s The maximum of the excitation focus is superimposed on the local minimum of the STED light distribution, so that emitters in sample 2 are excited to luminescence only in an excitation region with dimensions below the diffraction limit of optical microscopy. Thus, luminescent light emitted from sample 2 originates essentially only from the excitation region, which improves the resolution of the microscopic image to values below the diffraction limit.

By controlling the first polarization rotator 71, the second polarization rotator 72, and the fourth polarization rotator 74 of the light modulation module 100 (as described above for the embodiment according to FIG. 5 to FIG. 8) by the control unit 11, it is possible to quickly switch between four different STED light distributions, for example, to optimize lateral resolution or axial resolution.

Of course, the light modulation module 100 shown in FIG. 18 may also be replaced by the embodiments shown in FIG. 9, FIG. 10 to FIG. 12 or FIG. 13 to FIG. 15 and used in the same manner.

Figure 19:
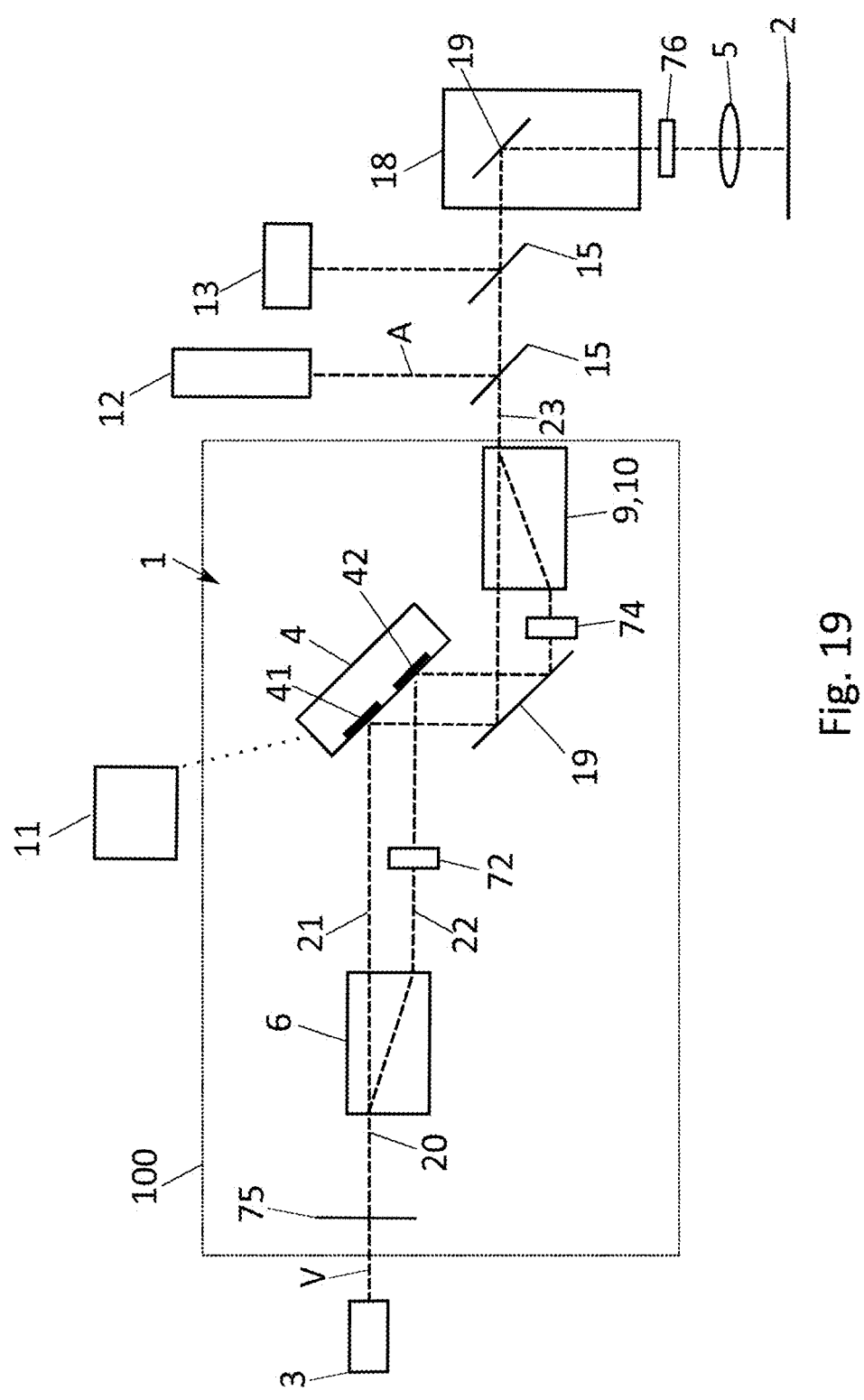
FIG. 19 shows a STED microscope according to the first aspect for superimposing two light distributions.

FIG. 19 shows a further embodiment of a STED microscope according to the first aspect, which is constructed analogously to the STED microscope shown in FIG. 18 (the same components are marked with the same reference signs), but comprises the light modulation module 100 shown in FIG. 3, i.e., a fifth polarization rotator 75, in particular a λ/2 plate, is provided which rotates the linearly polarized input light beam 20 so that it is at an acute angle, in particular 45°, to the preferred direction of the first beam displacement element 6. This ensures that the first beam displacement element 6 splits the input light beam 20 into the first output light beam 21 and the second output light beam 22. Alternatively, the structure shown in FIG. 4 may also be used with an optical fiber 16 that splits the STED light generated by the first light source 3 into two orthogonally linearly polarized and incoherent components.

The first output light beam 21 and the second output light beam 22 are phase modulated by the light modulation module 100, as described above for the embodiments according to FIG. 3 and FIG. 4, respectively, so that a combination of two STED light distributions is generated at the focus in the sample 2. These may be, for example, a STED (2D) donut and a STED bottle beam to increase both lateral resolution and axial resolution. The STED donut may be generated by a vortex phase pattern displayed on the first active surface 41 and the STED-bottle-beam may be generated by a phase pattern with an annular phase jump of n displayed on the second active surface 42.

Of course, the light modulation module 100 shown in FIG. 19 may also be replaced by the embodiment shown in FIG. 16 and FIG. 17 with four active surfaces 41,42,43,44 to switch between two different superpositions of two light distributions each.

Figure 20:
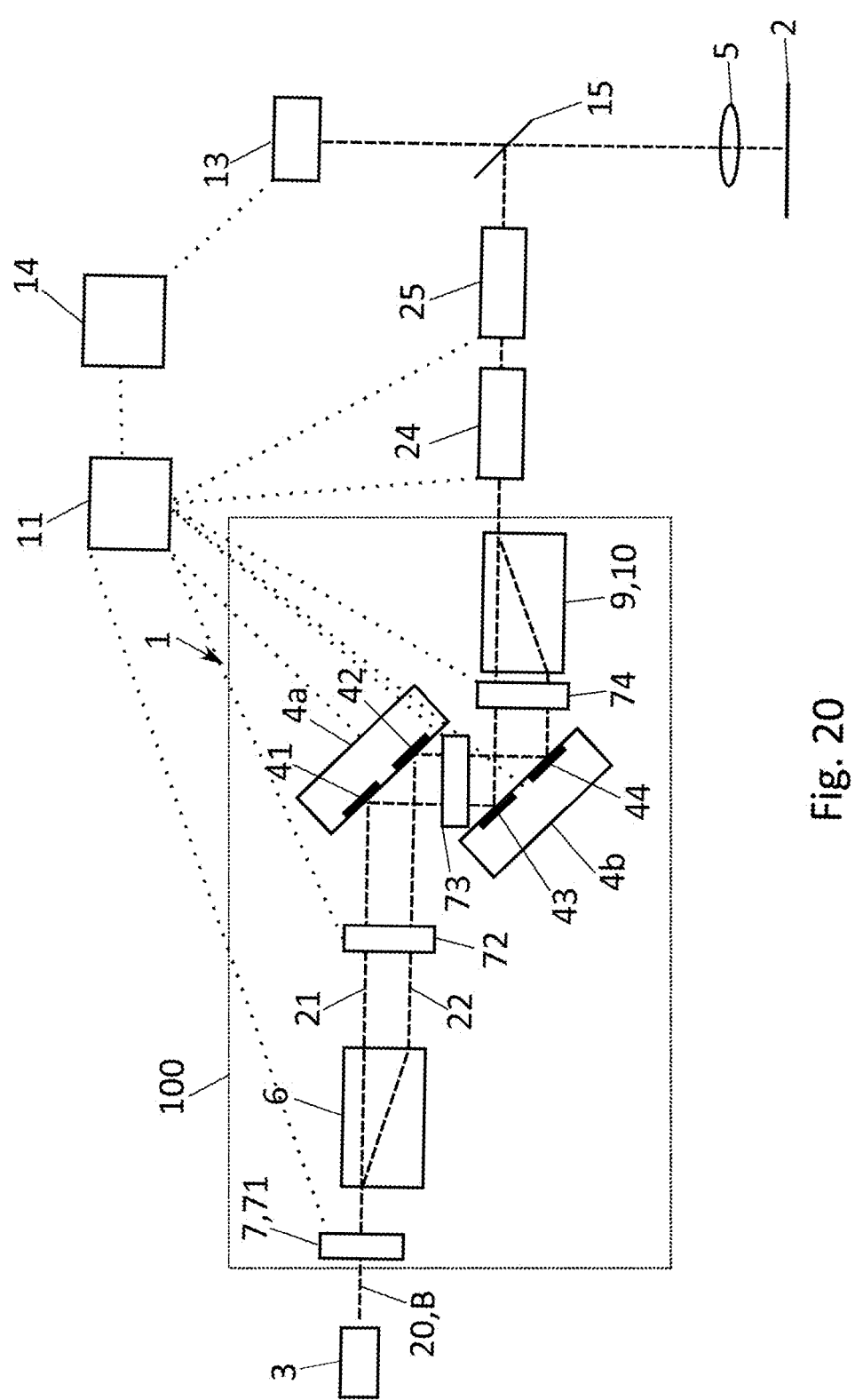
FIG. 20 shows a MINFLUX microscope according to the first aspect for polarization-dependent switching between four light distributions.

FIG. 20 shows a MINFLUX microscope according to the first aspect with a light modulation module 100 for switching between four light distributions, which is also shown in FIG. 5 to FIG. 8 and described above.

In this case, the first light source 3 generates illumination light B, in particular excitation light for exciting individual emitters in the sample 2. The linearly polarized excitation light is coupled into the light modulation module 100 to alternatively generate one of four light distributions with a local minimum at the focus in the sample 2. The modulated excitation light beam passes through a first beam deflection unit 24 and a second beam deflection unit 25, which laterally deflect the local minimum of the excitation light distribution in the sample 2 in two mutually perpendicular directions (i.e., perpendicular to the propagation direction of the light beam). The first beam deflection unit 24 and the second beam deflection unit 25 may be, for example, electro-optical deflectors (EODs) with high positional accuracy.

The first beam deflection unit 24 and the second beam deflection unit 25 are controlled by a control unit 11, which may additionally control the first polarization rotator 71, the second polarization rotator 72, the third polarization rotator 73 and the fourth polarization rotator 74. Alternatively, a separate control unit may also be provided for this purpose.

The photons emitted by individual luminescent emitters in the sample 2 are detected by a detector 13, which is connected to a computing unit 14, which calculates the position of the individual luminescent emitter from the detected photons.

In a specific embodiment of a MINFLUX method that may be performed with the MINFLUX microscope shown in FIG. 20, a single emitter is first found in the sample 2, in particular using methods known from the prior art, and an initial position estimate is performed. Then, the local minimum of the excitation light distribution is successively placed at illumination positions that form an illumination pattern, e.g., a hexagonal pattern, around the initially estimated position. For each illumination position, photons are detected and registered by the detector 13. Then, a position estimate is calculated with the computing unit 14 using a position estimator (e.g., a maximum likelihood estimator, MLE, or a least mean square estimator, LMSE). In particular, the procedure is performed iteratively, i.e., the local minimum of the excitation light distribution is placed at recalculated illumination positions around the position determined in the previous iteration step, and luminescence photons are acquired again for each position to then calculate a new position estimate. In particular, in each iteration step, the illumination pattern is reduced in size and the total intensity of the illumination light B is increased to further increase the position accuracy. In particular, in order to be able to perform an iterative MINFLUX process, the computing unit 14 is connected to the control unit 11.

In particular, the MINFLUX method may also be a tracking method in which position estimates of an emitter moving in the sample 2 are performed at short time intervals in order to obtain a trajectory of the emitter. For this purpose, in particular, the measurement parameters are adjusted to somewhat lower accuracy and higher speed.

With the light modulation module 100 according to the present specification, the excitation light distribution may also be adjusted very quickly, particularly in such a tracking process, by switching between different phase patterns statically displayed on the active surfaces 41,42,43,44 by polarization switching.

Another possible application is a fast switch between a regular, Gaussian excitation focus (which may be generated by an unstructured, uniform phase pattern) and an excitation focus with a local minimum, e.g., a (2D) donut or a bottle beam). With the regular focus, for example, a scan of sample 2 may be performed to find and pre-localize a single emitter, while the actual MINFLUX procedure is performed with the excitation light distribution with the local minimum.

Instead of the light modulation module 100 according to FIG. 5 to FIG. 8, the embodiments according to FIG. 1 and FIG. 2, FIG. 9, FIG. 10 to FIG. 12, FIG. 13 to FIG. 15 or FIG. 16 and FIG. 17 in particular may of course also be used in an analogous manner in the MINFLUX microscope.

LIST OF REFERENCE SIGNS

1 Luminescence microscope
2 Sample
3 First light source
4 Light modulator
4a First light modulator
4b Second light modulator
5 Objective lens
6 First beam displacement element
7 Switching element
8 Reflection element
9 Output beam combination unit
10 Second beam displacement element
11 Control unit
12 Second light source
13 Detector
14 Computing unit
15 Fiber coupler
16 Optical fiber
17 Beam splitter
18 Scanner
19 Mirror
20 Input light beam
21 First output light beam
22 Second output light beam
23 Combined output light beam
24 First beam deflection unit
25 Second beam deflection unit
41 First active surface
42 Second active surface
43 Third active surface
44 Fourth active surface
71 First polarization rotator
72 Second polarization rotator
73 Third polarization rotator
74 Fourth polarization rotator
75 Fifth polarization rotator

76 Sixth polarization rotator
A Excitation light
B Illumination light
E Emitter
V Luminescence inhibition light
x1 First direction
x2 Second direction
x3 Third direction

The invention claimed is:

1. A luminescence microscope for imaging a sample or for localizing emitters in a sample or tracking emitters in a sample, the tracking being performed by obtaining position estimates of an emitter moving in the sample at time intervals to obtain a trajectory of the emitter, the luminescence microscope comprising a first light source configured to generate an input light beam, at least one light modulator comprising a first active surface and a second active surface, the first active surface and the second active surface being configured to modulate the phase and/or the amplitude of light incident on the respective active surface, an objective lens configured to focus the light modulated by the light modulator in its phase and/or amplitude into the sample so that at least one light intensity distribution is formed in the sample, wherein the luminescence microscope comprises a first beam displacement element which is configured to generate, in a polarization-dependent manner, a first output light beam and/or a second output light beam from the input light beam, such that if the input light beam has only one linearly polarized component that is parallel to a preferred direction of the first beam displacement element, only the first output light beam is formed, if the input light beam has only one linearly polarized component that is orthogonal to the preferred direction of the first beam displacement element, only the second output light beam is formed, and if the input light beam has components that are parallel and components that are orthogonal to the preferred direction of the at least one beam displacement element, the input light beam is split into the first output light beam and the second output light beam, the first beam displacement element being arranged in such a way that the first output light beam impinges on the first active surface and the second output light beam impinges on the second active surface, wherein the first beam displacement element is configured such that the first output light beam and the second output light beam form an angle of less than 90° with respect to each other when exiting the first beam displacement element, wherein the first active surface and the second active surface modulate light incident on the respective active surface in its phase and/or in its amplitude in a polarization-dependent manner, such that the phase and/or the amplitude of light that is linearly polarized in a preferred direction of the at least one light modulator is modulated and the phase and/or the amplitude of light that is polarized orthogonally to the preferred direction is not modulated, wherein the luminescence microscope comprises a third active surface and a fourth active surface of at least one light modulator, wherein the third active surface and the fourth active surface are configured and arranged, so that the first output light beam impinges on the third active surface after impinging on the first active surface and the second output light beam impinges on the fourth active surface after impinging on the second active surface, wherein the third active surface and the fourth active surface modulate the light incident on the respective surface in its phase and/or in its amplitude depending on its polarization.

2. The luminescence microscope according to claim 1, wherein the luminescence microscope comprises a third polarization rotator arranged between the first active surface and the third active surface and/or between the second active surface and the fourth active surface, which is configured to rotate the polarization direction of the first output light beam and/or the polarization direction of the second output light beam.

3. The luminescence microscope according to claim 1, wherein the luminescence microscope comprises a reflection element arranged between the first active surface and the third active surface and/or between the second active surface and the fourth active surface, wherein the reflection element is configured to reflect the first output light beam emanating from the first active surface onto the third active surface and/or to reflect the second output light beam emanating from the second active surface onto the fourth active surface.

4. The luminescence microscope according to claim 3, wherein the first active surface, the second active surface, the third active surface and the fourth active surface are formed by the same light modulator.

5. A method for imaging a sample or for localizing emitters in a sample or tracking emitters in a sample by obtaining position estimates of an emitter moving in the sample at time intervals to obtain a trajectory of the emitter, the method being performed by a luminescence microscope comprising a first light source, at least one light modulator comprising a first active surface and a second active surface, an objective lens and a first beam displacement element, wherein an input light beam is generated by the first light source, wherein a first output light beam and/or a second output light beam is generated from the input light beam in a polarization-dependent manner by the first beam displacement element, such that if the input light beam has only one linearly polarized component that is parallel to a preferred direction of the first beam displacement element, only the first output light beam is formed, if the input light beam has only one linearly polarized component that is orthogonal to the preferred direction of the first beam displacement element, only the second output light beam is formed, and if the input light beam has components that are parallel and components that are orthogonal to the preferred direction of the at least one beam displacement element, the input light beam is split into the first output light beam and the second output light beam, wherein the first output light beam and the second output light beam form an angle of less than 90° with respect to each other when exiting the first beam displacement element, and wherein the first output light beam impinges on the first active surface of the at least one light modulator, wherein the first active surface modulates the first output light beam in its phase and/or in its amplitude, and/or wherein the second output light beam impinges on the second active surface of the at least one light modulator, wherein the second active surface modulates the second output light beam in its phase and/or in its amplitude, and wherein the first output light beam modulated in its phase and/or in its amplitude and/or the second output light beam modulated in its phase and/or in its amplitude are focused into the sample by the objective lens so that at least one light intensity distribution is formed in the sample.

6. The method according to claim 5, wherein the first output light beam, after impinging on the first active surface, impinges on a third active surface of at least one light modulator, wherein the third active surface is configured to modulate the first output light beam in its phase and/or in its amplitude, and/or wherein the second output light beam, after impinging on the second active surface, impinges on a fourth active surface of at least one light modulator, wherein the fourth active surface is configured to modulate the second output light beam in its phase and/or in its amplitude.

7. A luminescence microscope for imaging a sample or for localizing emitters in a sample or tracking emitters in a sample, the tracking being performed by obtaining position estimates of an emitter moving in the sample at time intervals to obtain a trajectory of the emitter, the luminescence microscope comprising a first light source configured to generate an input light beam, at least one light modulator comprising a first active surface and a second active surface, the first active surface and the second active surface being configured to modulate the phase and/or the amplitude of light incident on the respective active surface, an objective lens configured to focus the light modulated by the light modulator in its phase and/or amplitude into the sample so that at least one light intensity distribution is formed in the sample, wherein the luminescence microscope comprises a first beam displacement element which is configured to generate, in a polarization-dependent manner, a first output light beam and/or a second output light beam from the input light beam, such that if the input light beam has only one linearly polarized component that is parallel to a preferred direction of the first beam displacement element, only the first output light beam is formed, if the input light beam has only one linearly polarized component that is orthogonal to the preferred direction of the first beam displacement element, only the second output light beam is formed, and if the input light beam has components that are parallel and components that are orthogonal to the preferred direction of the at least one beam displacement element, the input light beam is split into the first output light beam and the second output light beam, the first beam displacement element being arranged in such a way that the first output light beam impinges on the first active surface and the second output light beam impinges on the second active surface, wherein the first beam displacement element is configured such that the first output light beam and the second output light beam form an angle of less than 90° with respect to each other when exiting the first beam displacement element, wherein the first active surface and the second active surface modulate light incident on the respective active surface in its phase and/or in its amplitude in a polarization-dependent manner, such that the phase and/or the amplitude of light that is linearly polarized in a preferred direction of the at least one light modulator is modulated and the phase and/or the amplitude of light that is polarized orthogonally to the preferred direction is not modulated, wherein the first light source is configured to provide the input light beam as a combination of a first linearly polarized component and a second linearly polarized component, wherein the polarization direction of the first component is orthogonal to the polarization direction of the second component, wherein the luminescence microscope is configured so that light of the first component generated by the first light source, modulated in its phase and/or its amplitude by the at least one light modulator and focused by the objective lens and light of the second component modulated in its phase and/or its amplitude by the at least one light modulator and focused by the objective lens form a combined light intensity distribution in the sample.

8. The luminescence microscope according to claim 7, wherein the first active surface and the second active surface are arranged in a pupil plane conjugate to a pupil of the objective lens, the first active surface and the second active surface being configured to modulate the first output light beam and/or the second output light beam in its phase.

9. The luminescence microscope according to claim 7, wherein the first beam displacement element is configured such that the first output light beam and the second output light beam are parallel to each other when exiting the first beam displacement element.

10. The luminescence microscope according to claim 7, wherein the first active surface and the second active surface are partial surfaces of an active surface of the same light modulator.

11. The luminescence microscope according to claim 7, wherein the luminescence microscope comprises a second polarization rotator arranged between the first beam displacement element and the first active surface and/or between the first beam displacement element and the second active surface, wherein the second polarization rotator is configured to rotate the polarization direction of the first output light beam and/or of the second output light beam.

12. The luminescence microscope according to claim 7, wherein the luminescence microscope comprises an output beam combination unit which is configured to combine the first output light beam and the second output light beam into a combined output light beam, wherein the output beam combination unit is the first beam displacement element or a further second beam displacement element.

13. The luminescence microscope according to claim 7, wherein the luminescence microscope comprises a control unit configured to control the at least one light modulator such that a light intensity distribution with a local minimum is formed in the sample.

14. The luminescence microscope according to claim 7, wherein the first light source is configured to generate illumination light which affects light emissions from emitters in the sample, a control unit of the luminescence microscope being configured to perform an illumination sequence with a plurality of illumination steps, wherein the sample is respectively illuminated with a light intensity distribution of the illumination light with a local minimum in the illumination steps, such that illumination positions in the sample are illuminated with different light intensities of the illumination light in the illumination steps, wherein the local minimum of the light intensity distribution is positioned in a region around a presumed position of an emitter in the sample in the illumination steps, and wherein the luminescence microscope comprises a detector and a computing unit, wherein the detector is configured to detect light emissions of the emitter for the respective illumination steps, and wherein the computing unit is configured to determine the position of the emitter in the sample from the light emissions detected for the respective illumination steps.

15. A luminescence microscope for imaging a sample or for localizing emitters in a sample or tracking emitters in a sample, the tracking being performed by obtaining position estimates of an emitter moving in the sample at time intervals to obtain a trajectory of the emitter, the luminescence microscope comprising a first light source configured to generate an input light beam, at least one light modulator comprising a first active surface and a second active surface, the first active surface and the second active surface being configured to modulate the phase and/or the amplitude of light incident on the respective active surface, an objective lens configured to focus the light modulated by the light modulator in its phase and/or amplitude into the sample so that at least one light intensity distribution is formed in the sample, wherein the luminescence microscope comprises a first beam displacement element which is configured to generate, in a polarization-dependent manner, a first output light beam and/or a second output light beam from the input light beam, such that if the input light beam has only one linearly polarized component that is parallel to a preferred direction of the first beam displacement element, only the first output light beam is formed, if the input light beam has only one linearly polarized component that is orthogonal to the preferred direction of the first beam displacement element, only the second output light beam is formed, and if the input light beam has components that are parallel and components that are orthogonal to the preferred direction of the at least one beam displacement element, the input light beam is split into the first output light beam and the second output light beam, the first beam displacement element being arranged in such a way that the first output light beam impinges on the first active surface and the second output light beam impinges on the second active surface, wherein the first beam displacement element is configured such that the first output light beam and the second output light beam form an angle of less than 90° with respect to each other when exiting the first beam displacement element, wherein the first active surface and the second active surface modulate light incident on the respective active surface in its phase and/or in its amplitude in a polarization-dependent manner, such that the phase and/or the amplitude of light that is linearly polarized in a preferred direction of the at least one light modulator is modulated and the phase and/or the amplitude of light that is polarized orthogonally to the preferred direction is not modulated, wherein the luminescence microscope comprises an output beam combination unit which is configured to combine the first output light beam and the second output light beam into a combined output light beam, wherein the output beam combination unit is the first beam displacement element or a further second beam displacement element, wherein the luminescence microscope comprises a fourth polarization rotator arranged between the at least one light modulator and the output beam combination unit, the fourth polarization rotator being configured to rotate the polarization direction of the first output light beam or the second output light beam, so that the first output light beam and the second output light beam are combined by the output beam combination unit into the combined output light beam.

16. The luminescence microscope according to claim 15, wherein the first light source is configured to provide the input light beam in a linearly polarized manner, the luminescence microscope comprising a switching element, which is configured to rotate the polarization direction of the input light beam upon receiving a switching signal.

17. The luminescence microscope according to claim 15, wherein the first beam displacement element is configured such that the first output light beam and the second output light beam are parallel to each other when exiting the first beam displacement element.

18. The luminescence microscope according to claim 15, wherein the first active surface and the second active surface are partial surfaces of an active surface of the same light modulator.

19. The luminescence microscope according to claim 15, wherein the luminescence microscope comprises a second polarization rotator arranged between the first beam displacement element and the first active surface and/or between the first beam displacement element and the second active surface, wherein the second polarization rotator is configured to rotate the polarization direction of the first output light beam and/or of the second output light beam.

20. The luminescence microscope according to claim 19, wherein the second polarization rotator is configured to rotate the polarization direction of the first output light beam or the second output light beam depending on its wavelength.

21. The luminescence microscope according to claim 15, wherein the luminescence microscope comprises a control unit configured to control the at least one light modulator such that a light intensity distribution with a local minimum is formed in the sample.

22. The luminescence microscope according to claim 15, wherein the first light source is configured to generate luminescence inhibition light that modulates light emissions from emitters in the sample, the luminescence microscope comprising a second light source configured to generate excitation light that induces light emissions from the emitters in the sample.

23. A luminescence microscope for imaging a sample or for localizing emitters in a sample or tracking emitters in a sample, the tracking being performed by obtaining position estimates of an emitter moving in the sample at time intervals to obtain a trajectory of the emitter, the luminescence microscope comprising a first light source configured to generate an input light beam, at least one light modulator comprising a first active surface and a second active surface, the first active surface and the second active surface being configured to modulate the phase and/or the amplitude of light incident on the respective active surface, an objective lens configured to focus the light modulated by the light modulator in its phase and/or amplitude into the sample so that at least one light intensity distribution is formed in the sample, wherein the luminescence microscope comprises a first beam displacement element which is configured to generate, in a polarization-dependent manner, a first output light beam and/or a second output light beam from the input light beam, such that if the input light beam has only one linearly polarized component that is parallel to a preferred direction of the first beam displacement element, only the first output light beam is formed, if the input light beam has only one linearly polarized component that is orthogonal to the preferred direction of the first beam displacement element, only the second output light beam is formed, and if the input light beam has components that are parallel and components that are orthogonal to the preferred direction of the at least one beam displacement element, the input light beam is split into the first output light beam and the second output light beam, the first beam displacement element being arranged in such a way that the first output light beam impinges on the first active surface and the second output light beam impinges on the second active surface, wherein the first beam displacement element is configured such that the first output light beam and the second output light beam form an angle of less than 90° with respect to each other when exiting the first beam displacement element, wherein the first active surface and the second active surface modulate light incident on the respective active surface in its phase and/or in its amplitude in a polarization-dependent manner, such that the phase and/or the amplitude of light that is linearly polarized in a preferred direction of the at least one light modulator is modulated and the phase and/or the amplitude of light that is polarized orthogonally to the preferred direction is not modulated, wherein the first light source is configured to generate illumination light which affects light emissions from emitters in the sample, a control unit of the luminescence microscope being configured to perform an illumination sequence with a plurality of illumination steps, wherein the sample is respectively illuminated with a light intensity distribution of the illumination light with a local minimum in the illumination steps, such that illumination positions in the sample are illuminated with different light intensities of the illumination light in the illumination steps, wherein the local minimum of the light intensity distribution is positioned in a region around a presumed position of an emitter in the sample in the illumination steps, and wherein the luminescence microscope comprises a detector and a computing unit, wherein the detector is configured to detect light emissions of the emitter for the respective illumination steps, and wherein the computing unit is configured to determine the position of the emitter in the sample from the light emissions detected for the respective illumination steps.

* * * * *